(12) United States Patent
Nakayama

(10) Patent No.: US 8,786,635 B2
(45) Date of Patent: Jul. 22, 2014

(54) ROTATING AN IMAGE ON A DISPLAY DEVICE OF AN IMAGE FORMING APPARATUS DEPENDENT UPON THE INSTALLATION ANGLE OF THE BODY OF THE IMAGE FORMING APPARATUS

(71) Applicant: Daisuke Nakayama, Nagoya (JP)

(72) Inventor: Daisuke Nakayama, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/850,940

(22) Filed: Mar. 26, 2013

(65) Prior Publication Data

US 2014/0092401 A1    Apr. 3, 2014

(30) Foreign Application Priority Data

Sep. 28, 2012    (JP) ................. 2012-216497

(51) Int. Cl.
*G09G 5/00*    (2006.01)
*H04N 1/00*    (2006.01)

(52) U.S. Cl.
CPC ................. *H04N 1/00408* (2013.01)
USPC ................. 345/649; 358/1.15; 715/274

(58) Field of Classification Search
CPC .. G06F 3/1256; H04N 1/3877; H04N 1/0044; H04N 1/00456
USPC ............ 345/649; 358/1.15, 1.5, 400; 715/274
See application file for complete search history.

(56) References Cited

U.S. PATENT DOCUMENTS

2009/0002395 A1 *    1/2009    Yamada ..................... 345/649

* cited by examiner

*Primary Examiner* — Eric A Rust
(74) *Attorney, Agent, or Firm* — Baker Botts L.L.P.

(57) ABSTRACT

A medium conveying device, including a body, which includes a first inlet port, a first ejection port, a second inlet port, a second ejection port, and a conveyance path; a display device provided in the body that displays a display image. The medium conveying device may include a control device configured to acquire, via an acquisition device, installation information in which an installation condition of the body is reflected or setting information, which is externally set, regarding the installation condition of the body. The display device may be controlled, in accordance with the installation information or the setting information acquired by the acquisition device, in order to change the direction of the displayed image which is displayed on the display device.

14 Claims, 16 Drawing Sheets

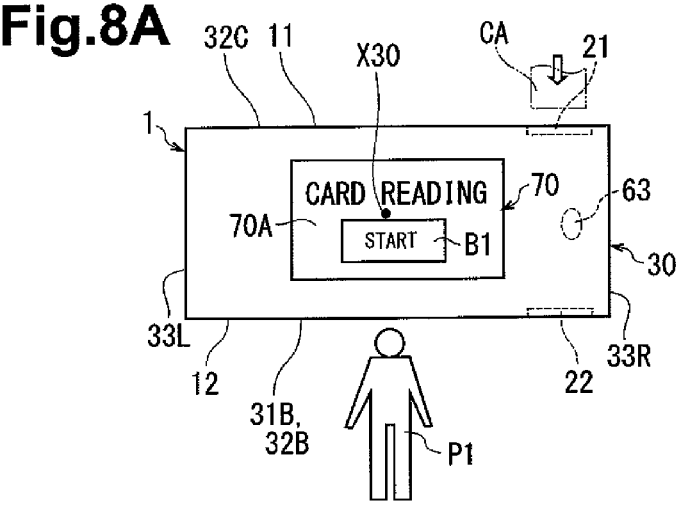
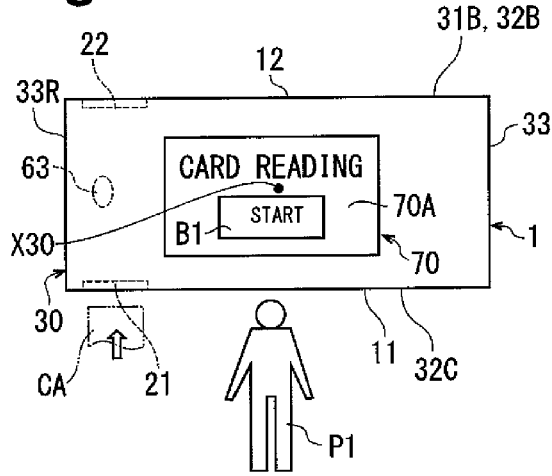
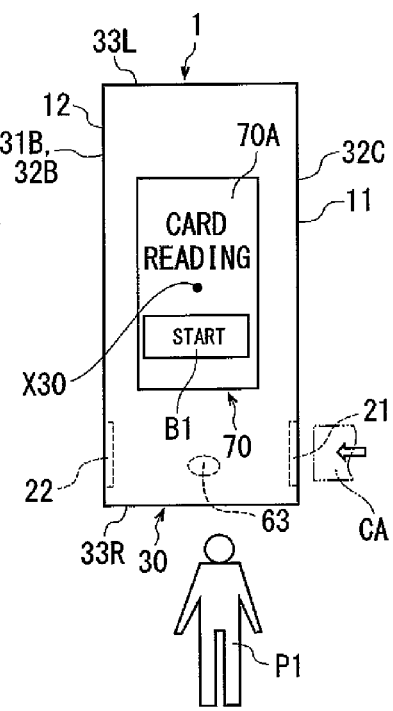

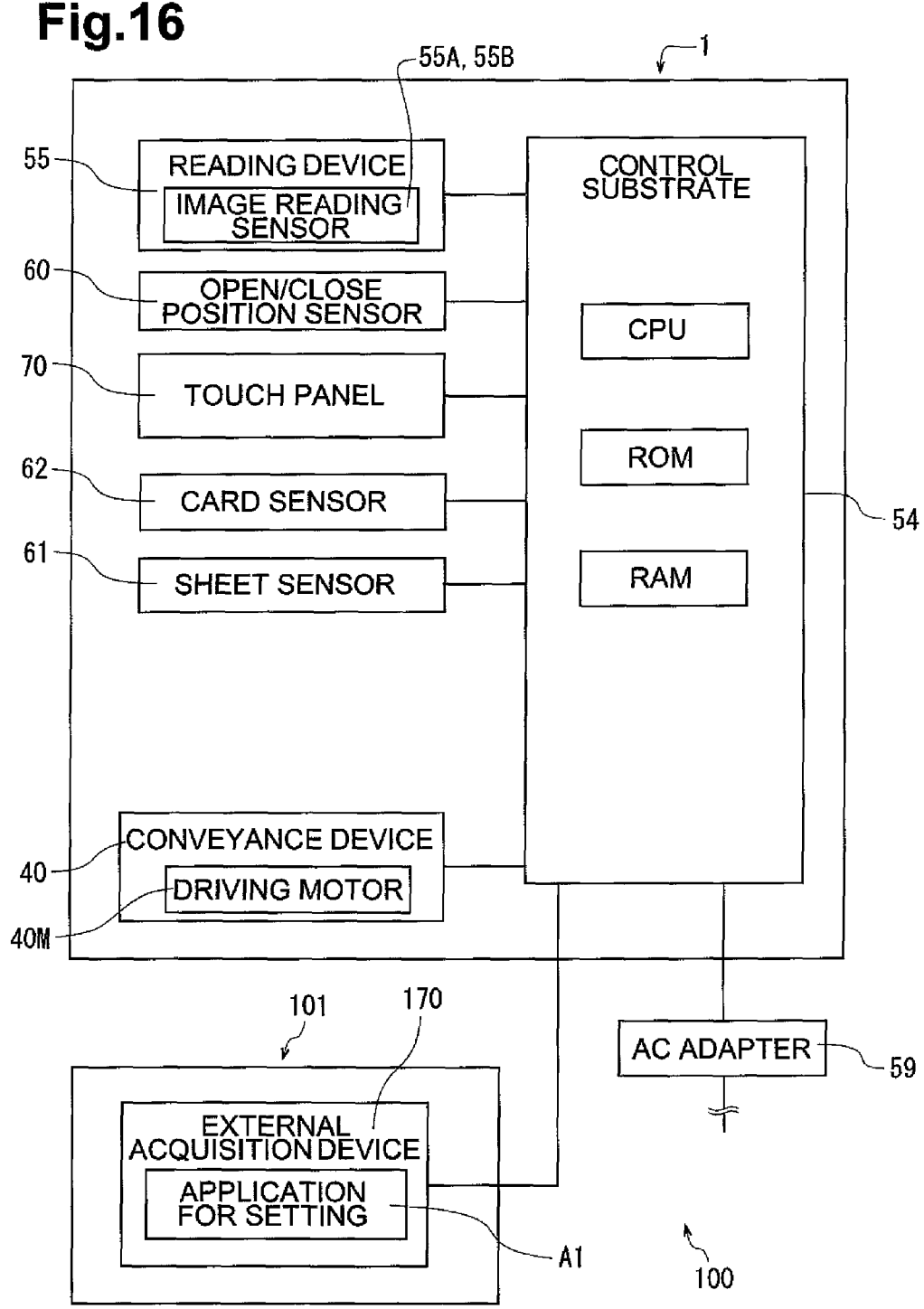

ROTATING AN IMAGE ON A DISPLAY DEVICE OF AN IMAGE FORMING APPARATUS DEPENDENT UPON THE INSTALLATION ANGLE OF THE BODY OF THE IMAGE FORMING APPARATUS

CROSS-REFERENCE TO RELATED APPLICATION

The present application claims priority from Japanese Patent Application No. 2012-216497, filed on Sep. 28, 2012, the disclosure of which is incorporated herein by reference.

BACKGROUND OF THE DISCLOSURE

1. Field of the Disclosure

The disclosure relates generally to image reading apparatuses, image reading systems, and medium conveying devices.

2. Description of the Related Art

An image reading apparatus may include a body. A first inlet port, a first ejection port, a second inlet port, a second ejection port, and a conveyance path may be formed in the body. A first medium may be introduced into the first inlet port. The first medium may be ejected from the first ejection port. A second medium having a smaller width than that of the first medium may be introduced into the second inlet port. The second medium may be ejected from the second ejection port.

Such an image reading apparatus may include, in the body, a display device on which an image is displayed. Installation conditions of the body may be desirably changed in an operation such as, for example, insertion of a first medium into a first inlet port, ejection of the first medium from a first ejection port, insertion of a second medium into a second inlet port, and ejection of the second medium from a second ejection port. Therefore, for a certain installation condition that is suitable for carrying out a certain option, the image may be displayed in a direction that corresponds to a direction in which a user is viewing the image. However, when the installation condition is changed to be suitable for carrying out another option, the direction that the image is displayed on the display device may no longer correspond to a new direction in which the user is viewing the image, which may make it difficult for the user to view the image that is displayed on the display device.

SUMMARY OF THE DISCLOSURE

According to an embodiment of the invention, an image reading apparatus may comprise a body. The body may comprise a first inlet port configured to introduce a first medium into the image reading apparatus, a first ejection port configured to eject the first medium from the image reading apparatus, a second inlet port configured to introduce a second medium into the image reading apparatus, a second ejection port configured to eject the second medium from the image reading apparatus, and a conveyance path configured along which the first medium introduced into the first inlet port and the second medium introduced into the second inlet port are conveyed. The second medium may be narrower than the first medium. The image reading apparatus may also comprise a reading device configured to read medium images on the first medium and the second medium which are conveyed on the conveyance path. The image reading apparatus may also comprise a display device provided in the body, in which the display device is configured to display a displayed image. The image reading apparatus may also comprise a control device. The control device may be configured to acquire, via an acquisition device, at least one of installation information reflecting an installation condition of the body and setting information, which is externally set, regarding the installation condition of the body. The control device may also be configured to control the display device in accordance with at least one of the installation information and the setting information acquired by the acquisition device and to change a direction of the displayed image displayed on the display device.

According to another embodiment of the invention, an image reading system may comprise an image reading apparatus and an information processing apparatus. The image reading apparatus and the information processing apparatus may be configured to be connected to each other and configured such that information is transmittable therebetween. The image reading apparatus may comprise a body. The body may comprise a first inlet port configured to introduce a first medium into the image reading apparatus, a first ejection port configured to eject the first medium from the image reading apparatus, a second inlet port configured to introduce a second medium into the image reading apparatus, a second ejection port configured to eject the second medium from the image reading apparatus, and a conveyance path configured along which the first medium introduced into the first inlet port and the second medium introduced into the second inlet port are conveyed. The second medium may be narrower than the first medium. The image reading apparatus may also comprise a reading device configured to read medium images on the first medium and the second medium which are conveyed on the conveyance path. The image reading apparatus may also comprise a display device provided in the body, in which the display device is configured to display a displayed image. The information processing apparatus may comprise a first control device configured to acquire, via an external acquisition device, setting information, which is externally set, regarding the installation condition of the body. Moreover, one of the image reading apparatus and the information processing apparatus may comprise a second control device configured to control the display device in accordance with the setting information acquired by the acquisition device and to change a direction of the displayed image displayed on the display device.

According to yet another embodiment of the invention, a medium conveying device may comprise a body. The body may comprise a first inlet port configured to introduce a first medium into the medium conveying device, a first ejection port configured to eject the first medium from the medium conveying device, a second inlet port configured to introduce a second medium into the medium conveying device, a second ejection port configured to eject the second medium from the medium conveying device, and a conveyance path configured along which the first medium introduced into the first inlet port and the second medium introduced into the second inlet port are conveyed. The second medium may be narrower than the first medium. The medium conveying device may also comprise a display device provided in the body, in which the display device is configured to display a displayed image. The medium conveying device may also comprise a control device. The control device may be configured to acquire, via an acquisition device, at least one of installation information reflecting an installation condition of the body and setting information, which is externally set, regarding the installation condition of the body. The control device may also be configured to control the display device in accordance with at least one of the installation information and the setting information acquired by the acquisition device and to change a direction of the displayed image displayed on the display device.

Other objects, features, and advantages will be apparent to persons of ordinary skill in the art from the following detailed description of the invention and the accompanying drawings.

BRIEF DESCRIPTION OF THE DRAWINGS

For a more complete understanding of the present disclosure, needs satisfied thereby, and the objects, features, and advantages thereof, reference now is made to the following descriptions taken in connection with the accompanying drawings.

FIG. 8A is a schematic diagram showing a direction of an image displayed on a display screen provided in a body of an image reading apparatus.

FIG. 8B is a schematic diagram showing the direction of the image of FIG. 8A when the body is rotated 180 degrees.

FIG. 8C is a schematic diagram showing the direction of the image of FIG. 9A when the body is rotated 90 degrees.

FIG. 16 is a block diagram of an image reading system.

DETAILED DESCRIPTION OF EMBODIMENTS OF THE INVENTION

Figure 1:
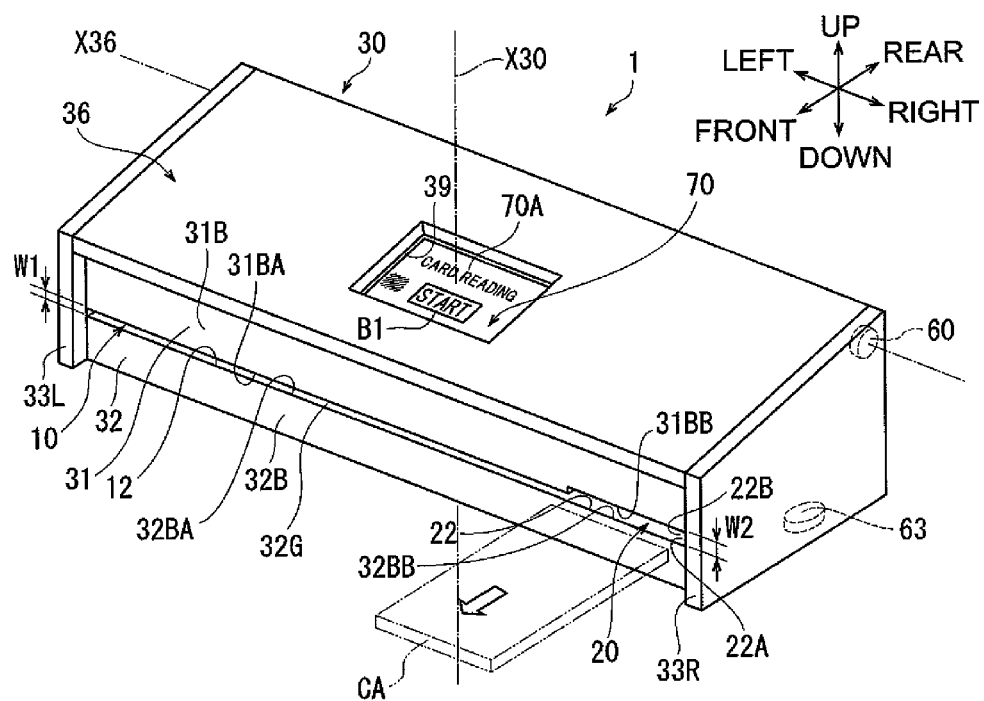
FIG. 1 is a perspective view showing an example of a front side of an image reading apparatus comprising a feed tray in a closed position.

Example embodiments are described in detail herein with reference to the accompanying drawings, like reference numerals being used for like corresponding parts in the various drawings.

The present disclosure may be applied to an image reading apparatus, an image forming apparatus, or a multi-functional peripheral.

Referring to FIGS. 1-3, 5-7, and 13-15, a legend may define a front direction, a rear direction, a left direction, a right direction, an up direction, a down direction, a front-rear direction, a left-right direction, a horizontal direction, and a vertical direction.

Referring now to FIG. 1, an image reading apparatus 1 may be an example of an image reading apparatus and a medium conveying device of the present disclosure. A side of a first ejection port 12 may be defined as a front side of the image reading apparatus 1, and a side on the left with respect to the first ejection port 12 may be defined as a left side of the image reading apparatus 1. A rear, right, upper, and lower sides of the image reading apparatus 1 may be defined in a similar manner.

The image reading apparatus 1 may comprise a housing 30, a feed tray 36, a control substrate 54, a conveyance device 40, a reading device 55, and a touch panel 70. The image reading apparatus 1 may also comprise an open/close position sensor 60, a sheet sensor 61, a card sensor 62, and a rotation sensor 63.

The housing 30 may be an example of a body of the present disclosure. The control substrate 54 may be an example of a display control device and a conveyance control device of the present disclosure. The control substrate 54 may also be an example of an acquisition device of the present disclosure. The touch panel 70 may be an example of a display device and a setting device of the present disclosure.

Figure 3:
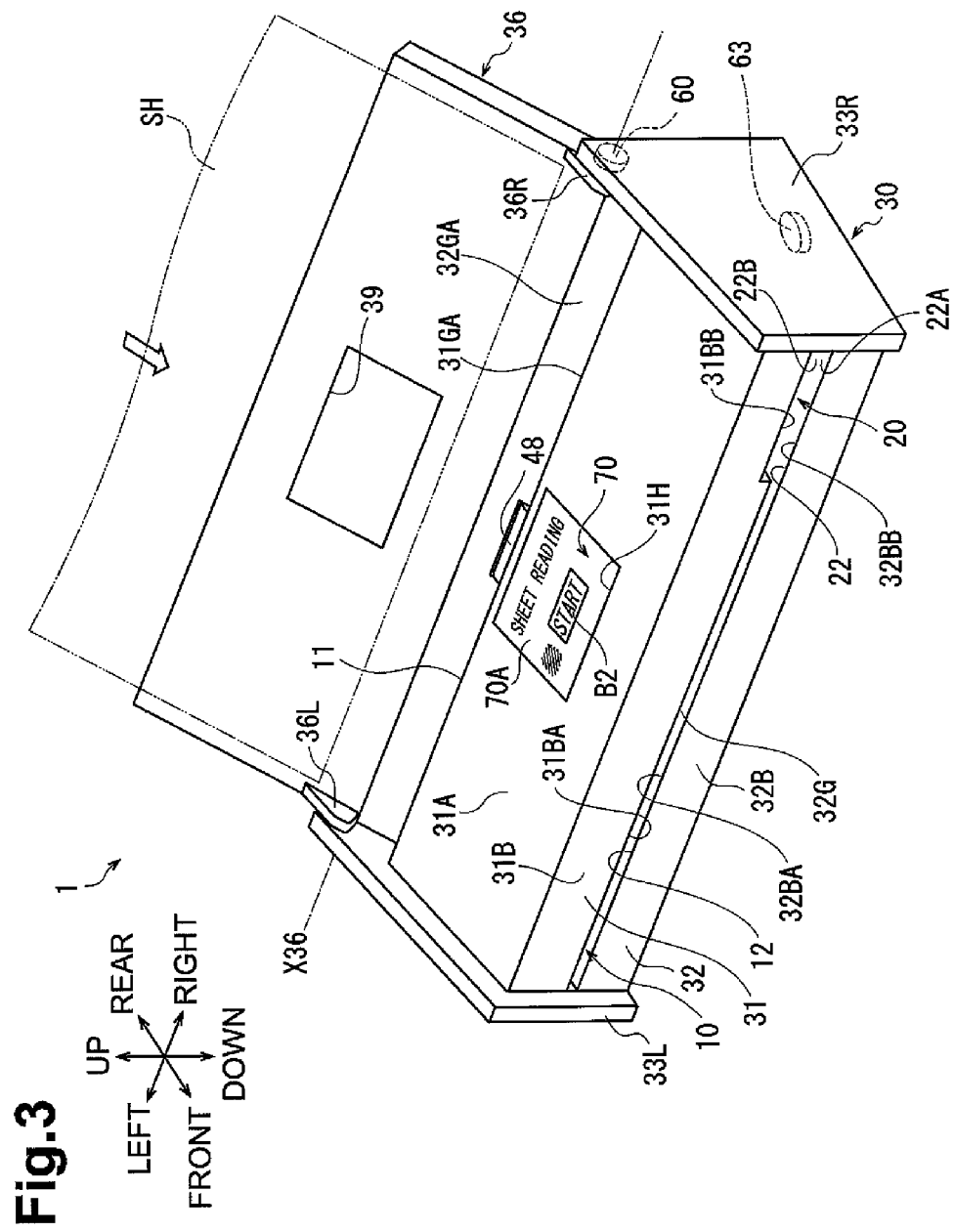
FIG. 3 is a perspective view showing an example of a front side of an image reading apparatus comprising a feed tray in an open position.
Figure 6:
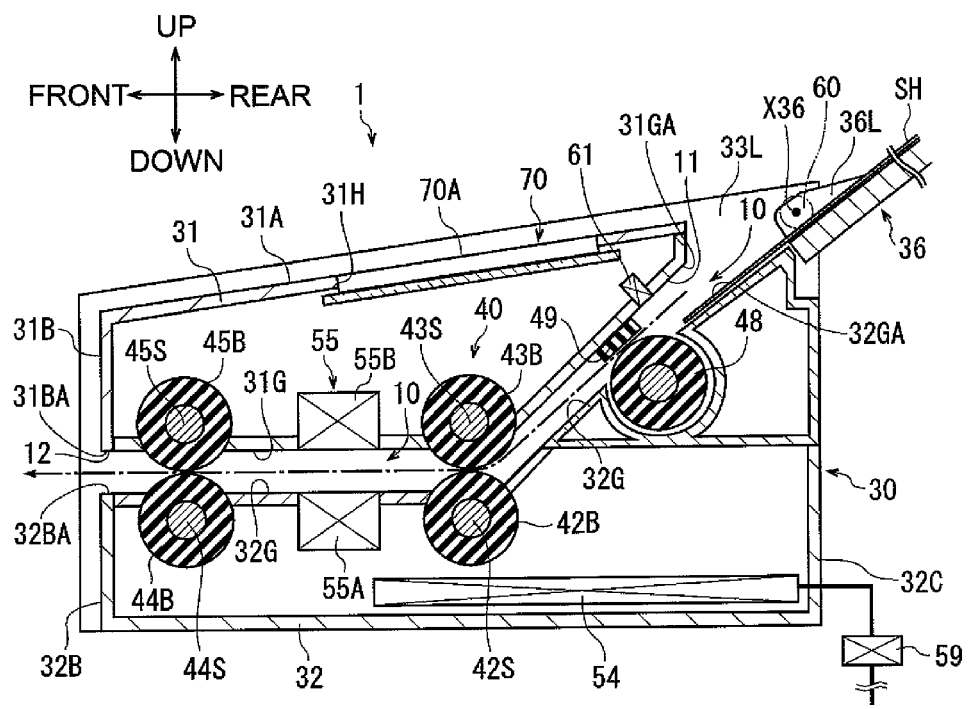
FIG. 6 is a schematic cross-sectional view along line A-A of FIG. 5.
Figure 7:
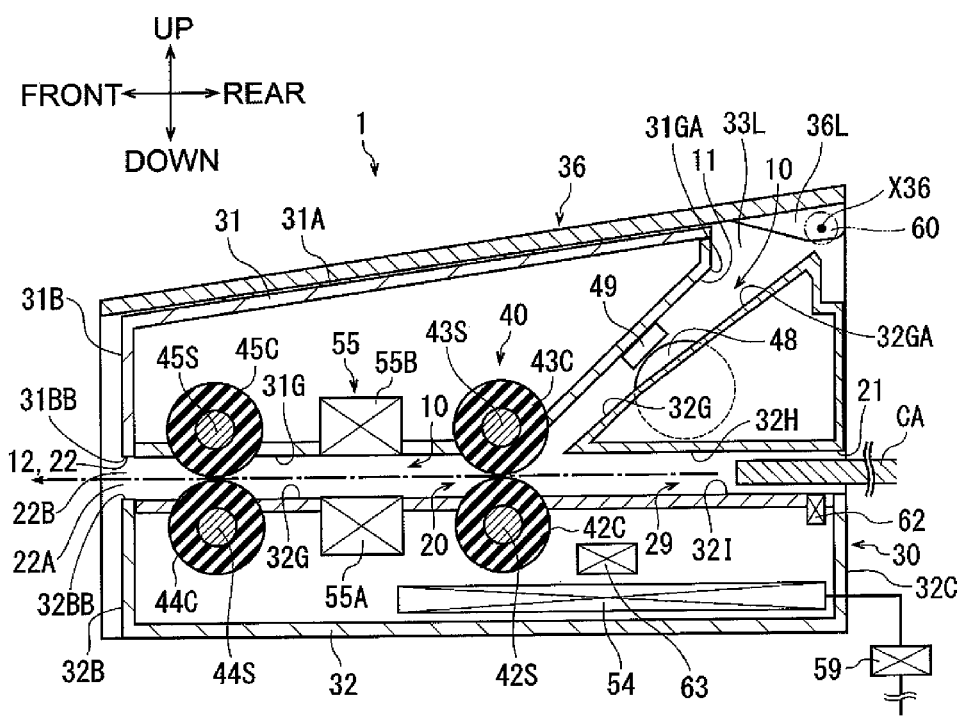
FIG. 7 is a schematic cross-sectional view along line B-B of FIG. 5.

Referring now to FIGS. 3, 6 and 7, the housing 30 may consist of a first housing 31, a second housing 32, and a pair of side frames 33L and 33R.

The first housing 31 may be situated on an upper side, and the second housing 32 may be situated on a lower side. The first housing 31 and the second housing 32 may face each other in the vertical direction with a space formed therebetween. The left side frame 33L may be disposed on outer left sides of the first housing 31 and the second housing 32, and the right side frame 33R may be disposed on outer right sides of the first housing 31 and the second housing 32.

The first housing 31 may comprise an upper surface 31A, a front surface 31B, and an upper guide surface 31G. The upper surface 31A may be a flat surface which faces upward. The upper surface 31A may be a sloped surface that slopes upward toward the rear direction. The touch panel 70 may be provided at the center of the upper surface 31A. The front surface 31B may be a flat surface which faces the front. The front surface 31B may extend vertically downward from a front end edge of the upper surface 31A. The upper guide surface 31G may be a flat surface which is bent and facing downward. The upper guide surface 31G may extend substantially horizontally in the rear direction from a lower end edge 31BA of the front surface 31B. The upper guide surface 31G may be bent at a particular position (e.g., at substantially the center of the first housing 31 in the front-rear direction) and slope upward toward the rear direction. Thus, the upper guide surface 31G may have a horizontal section extending from the lower end edge 31BA to the center of the first housing 31 in the front-rear direction and a sloped section extending toward the rear direction from the center of the first housing 31 in the front-rear direction.

The second housing 32 may include a front surface 32B, a lower guide surface 32G, and a rear surface 32C. The front surface 32B may be a flat surface which faces the front. An upper end edge 32BA of the front surface 32B may be separated from the lower end edge 31BA of the front surface 31B with a space therebetween. Moreover, the upper end edge 32BA may be disposed downward from the lower end edge 31BA. The front surface 32B may extend vertically downward. The lower guide surface 32G may be a flat surface which is bent and facing upward. The lower guide surface 32G may extend substantially horizontally in the rear direction from the upper end edge 32BA of the front surface 32B. The lower guide surface 32G may then be bent at a particular position (e.g., at substantially the center of the second housing 32 in the front-rear direction) and may subsequently be sloped upward toward the rear direction. Thus, the lower guide surface 32G may have a horizontal section extending from the upper end edge 32BA to the center of the second housing 32 in the front-rear direction and a sloped section extending toward the rear direction from the center of the second housing 32 in the front-rear direction. The rear surface 32C may be a flat surface which faces the rear. The rear surface 32C may extend in the up-down direction.

Figure 5:
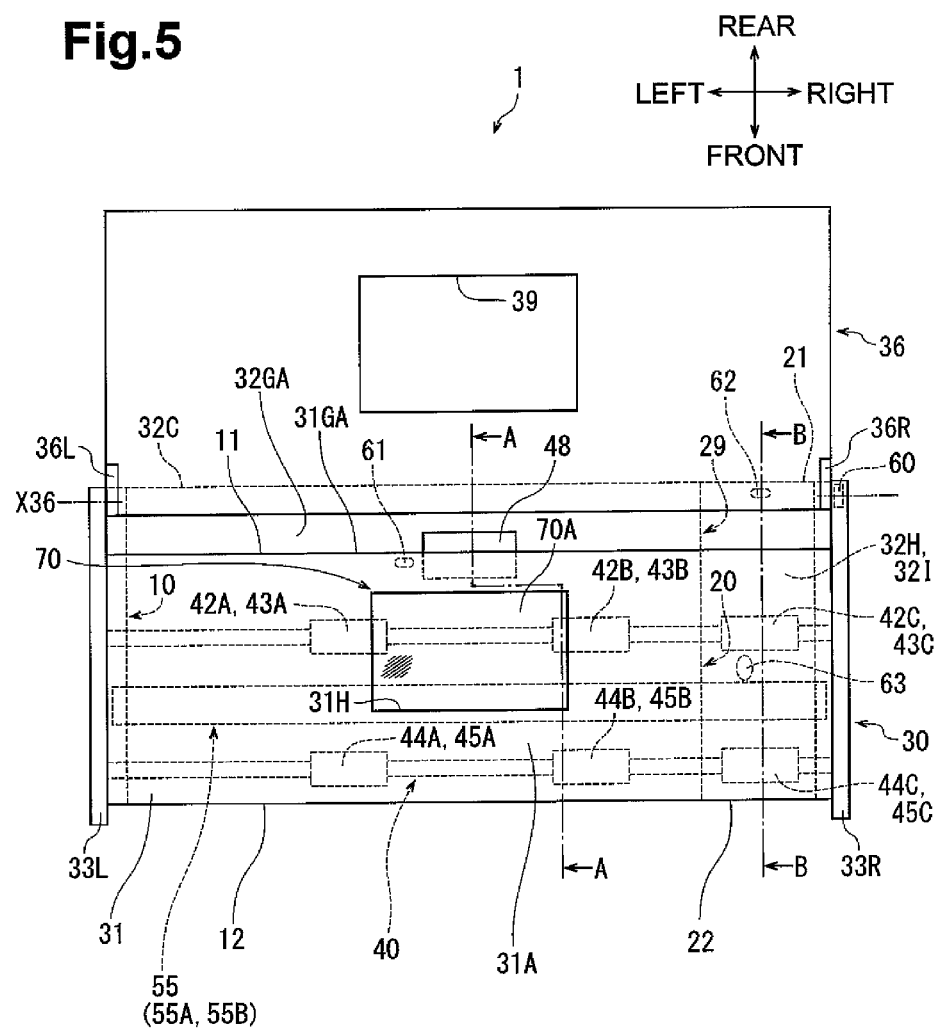
FIG. 5 shows a top view of an image reading apparatus comprising a feed tray in an open position.

Referring now to FIGS. 5 and 7, the second housing 32 may include a lower card guide surface 32I and an upper card guide surface 32H. The lower card guide surface 32I may extend horizontally from a right end portion of the horizontal section of the lower guide surface 32G to the rear surface 32C. The upper card guide surface 32H may be separated and disposed upward from the lower card guide surface 32I. The upper card guide surface 32H may extend parallelly to the lower card guide surface 32I and may extend horizontally in the rear direction to reach the rear surface 32C. As shown in FIG. 7, the position or height of the upper card guide surface 32H in the vertical direction and the height of the horizontal section of the upper guide surface 31G in the vertical direction may be substantially the same.

A side of the rear surface 32C may be an example of a first side of a reading device in the conveying direction of the first medium. The front surface 31B and the front surface 32B may be examples of a second side of the reading device in the conveying direction of the first medium.

As shown in FIGS. 1-3 and 5-7, a first inlet port 11, the first ejection port 12, and a conveyance path 10 may be formed in the housing 30.

Referring now to FIGS. 3 and 6, a sheet SH may be introduced into the first inlet port 11. The first inlet port 11 may receive the sheet SH. The sheet SH may be, for example, a paper sheet or an overhead projector ("OHP") sheet. The sheet SH may be an example of a first medium of the present disclosure. The first inlet port 11 may be formed between the first housing 31 and the second housing 32. In particular, the first inlet port 11 may comprise a gap or space between a rear end edge 31 GA of the upper guide surface 31G and a rear end edge 32GA of the lower guide surface 32G. The first inlet port 11 may extend from a position near the left side frame 33L to a position near the right side frame 33R in the left-right direction. The length of the first inlet port 11 in the left-right direction may be set to be greater than the width of the sheet SH.

The sheet SH may be ejected from the first ejection port 12. The first ejection port 12 may be formed between the first housing 31 and the second housing 32. In particular, the first ejection port 12 may be a gap or space between the lower end edge 31BA of the front surface 31B and the upper end edge 32BA of the front surface 32B. The first ejection port 12 may extend from a position near the left side frame 33L to a position near the right side frame 33R in the left-right direction. Similar to the first inlet port 11, the length of the first ejection port 12 in the left-right direction may be set to be greater than the width of the sheet SH.

As shown in FIGS. 6-7, the conveyance path 10 may guide the sheet SH from the first inlet port 11 to the first ejection port 12 (e.g., the conveyance path 10 may be configured such that the sheet SH is conveyed thereon). The conveyance path 10 may be formed between the first housing 31 and the second housing 32. In particular, the conveyance path 10 may be formed by the upper guide surface 31G and the lower guide surface 32G, which are disposed on an upper side and a lower side of the conveyance path 10, respectively. Guiding the sheet SH may comprise guiding the sheet SH by the upper guide surface 31G or guiding the sheet SH by the lower guide surface 32G. However, the sheet SH may not be in contact with the upper guide surface 31G or the lower guide surface 32G during this entire process. Instead, the sheet SH may be in contact only with the lower guide surface 32G during a part of the process. The conveyance path 10 may be sloped downward toward the front direction from the first inlet port 11. The conveyance path 10 may be bent at a particular position (e.g., the center of the housing 30 in the front-rear direction) and may extend horizontally to reach the first ejection port 12. Thus, the conveyance path 10 may have a sloped section extending from the first inlet port 11 to the center of the housing 30 in the front-rear direction and a horizontal section extending from the center of the housing 30 in the front-rear direction to the first ejection port 12.

As shown in FIGS. 5 and 7, an area disposed on a portion (e.g., a side) of the horizontal section of the conveyance path 10 may be a card conveying area 20. Further, as shown in FIGS. 1-3, 5 and 7, a second inlet port 21, a second ejection port 22, and a card path 29 may be formed in the housing 30.

Figure 2:
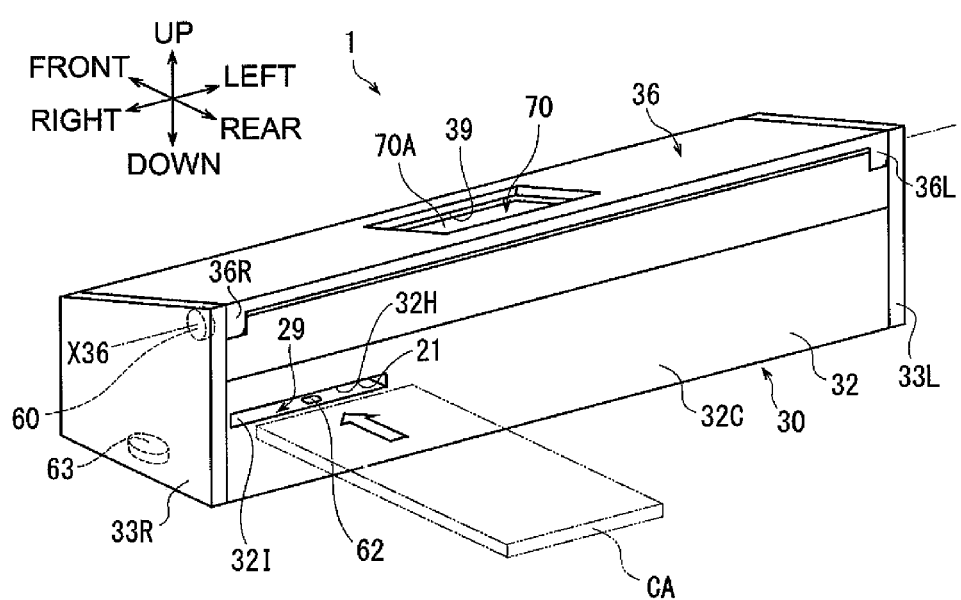
FIG. 2 is a perspective view showing an example of a rear side of an image reading apparatus comprising a feed tray in a closed position.

Referring now to FIGS. 2, 5, and 7, a card CA having a width that is smaller than the width of the sheet SH may be introduced into the second inlet port 21. The second inlet port 21 may receive the card CA. The card CA may be a sheet having an area that is smaller than that of the sheet SH. The card CA may be, for example, a business card, an ATM card, a membership card, or a license card. If the card CA is a paper sheet, such as a business card, the thickness of the card CA may be substantially the same as that of the sheet SH. If the card CA is a resin sheet, such as an ATM card, the thickness of the card CA may be greater than that of the sheet SH. Moreover, the rigidity of the card CA may be high. The card CA may be an example of a second medium. The second inlet port 21 may be formed in the second housing 32. In particular, the second inlet port 21 may open facing the rear direction at an intermediate position in the vertical direction on the rear surface 32C. The second inlet port may also be disposed on a portion of the rear surface 32C that is closer to the right side frame 33R than the left side frame 33L. The second inlet port 21 may also extend in the left-right direction. The length of the second inlet port 21 in the left-right direction may be greater than the width of the card CA. The position or height of the second inlet port 21 in the vertical direction may be substantially the same as that of the horizontal section of the conveyance path 10 and that of the first ejection port 12 in the vertical direction.

Referring now to FIGS. 1, 3, 5 and 7, the card CA may be ejected from the second ejection port 22. The second ejection port 22 may be formed between the first housing 31 and the second housing 32. In particular, the second ejection port 22 may be a gap or space between a right end portion 31 BB in the lower end edge 31 BA of the front surface 31B and a right end portion 32BB in the upper end edge 32BA of the front surface 32B. The second ejection port 22 may extend in an elongated manner to the left from a position near the right side frame 33R. Similar to the second inlet port 21, the length of the second ejection port 22 in the left-right direction may be set to be greater than that of the width of the card CA. The second ejection port 22 may be shared by a part or portion of the first ejection port 12 (e.g., the first ejection port 12 may comprise a portion of the second ejection port 22) at a position near the right side frame 33R (e.g., at a right end of the first ejection port 12).

In particular, as shown in FIG. 1, the first ejection port 12 may comprise a lower area 22A of the second ejection port 22. Therefore, a portion of the sheet SH may pass through the lower area 22A of the second ejection port 22 and may be ejected from the lower area 22A of the second ejection port 22. The card CA may be ejected from the lower area 22A of the second ejection port 22 or may be ejected from the lower area 22A and an upper area 22B of the second ejection port 22. Thus, the first ejection port 12 may include a portion of the second ejection port 22. Similarly, the first inlet port 11 may also comprise a portion of the second inlet port 21.

Moreover, as shown in FIG. 1, the opening width W2 of the second ejection port 22 in the vertical direction may be set to be greater than the opening width W1 of the first ejection port 12 in the vertical direction. The opening width W2 of the second ejection port 22 may be set according the thickness of the card CA or a range of thicknesses of cards CA.

Referring now to FIGS. 5 and 7, the card path 29 may be formed by the upper card guide surface 32H and the lower card guide surface 32I, which are disposed on an upper side and a lower side of the card path 29, respectively. The card path 29 and the card conveying area 20 may extend horizontally from the second inlet port 21 at the rear to the second ejection port 22 at the front. As described above, the card conveying area 20 may comprise an area disposed on a portion of the horizontal section of the conveyance path 10 (e.g., an area situated on a side of a right end of the conveyance path 10). The card path 29 and the card conveying area 20 may guide the card CA from the second inlet port 21 to the second ejection port 22.

Referring now to FIGS. 3 and 5, a pair of hinge portions 36L and 36R may be formed at a left corner and a right corner of the feed tray 36, respectively. The hinge portions 36L and 36R may be formed, for example, in an integrated manner. An operation opening 39, which opens upward, may be formed at the center of the feed tray 36. The operation opening 39 may be an example an opening of the present disclosure. The feed tray 36 may be pivotally supported about an opening and closing axis X36 by the side frames 33L and 33R via the hinge portions 36L and 36R. The opening and closing axis X36 may be situated at a position in the rear, extending in the left-right direction from an upper portion of the side frame 33L to the upper portion of the side frame 33R.

Referring now to FIGS. 1, 2 and 7, the feed tray 36 may cover the upper surface 31A of the first housing 31 in a state in which the feed tray 36 is closed. The state or position of the feed tray 36 shown in FIGS. 1, 2 and 7 may be referred to as a "closed position." In the closed position, the feed tray 36 may be positioned such that it slopes downward in the front direction. The feed tray 36 may extend from the opening and closing axial center X36 toward the front. As shown in FIG. 1, the operation opening 39 may be situated on an upper side of the touch panel 70 when the feed tray 36 is in the closed position such that the touch panel 70 is exposed and viewable from outside (e.g., of the image reading apparatus 1).

Referring now to FIGS. 3, 5, and 6, the feed tray 36 may also be set to pivot in the rear direction about the opening and closing axis X36 from a state in which the feed tray 36 is opened. For example, as shown in FIG. 1, the position of the feed tray 36 may be changed to be at a position in which the feed tray 36 slopes upward in the rear direction. In such a position, the feed tray 36 may extend from the rear side of the housing 30 toward the rear. The position of the feed tray 36 shown in FIGS. 3, 5, and 6 may be referred to as an "open position."

Moreover, as shown in FIGS. 3 and 6, in the open position, the feed tray 36 may extend from a sloped portion of the lower guide surface 32G toward the rear. Setting the feed tray 36 to the open position may expose the first inlet port 11. One or more sheets SH may be placed on the feed tray 36. Although not illustrated, the feed tray 36 may include a pair of left and right guide devices. The guide devices may align, in the left-right direction, the one or more sheets SH placed on the feed tray 36. The one or more sheets SH placed on the feed tray 36 may be introduced into the first inlet port 11 and guided to the first ejection port 12 via the conveyance path 10.

Figure 4:
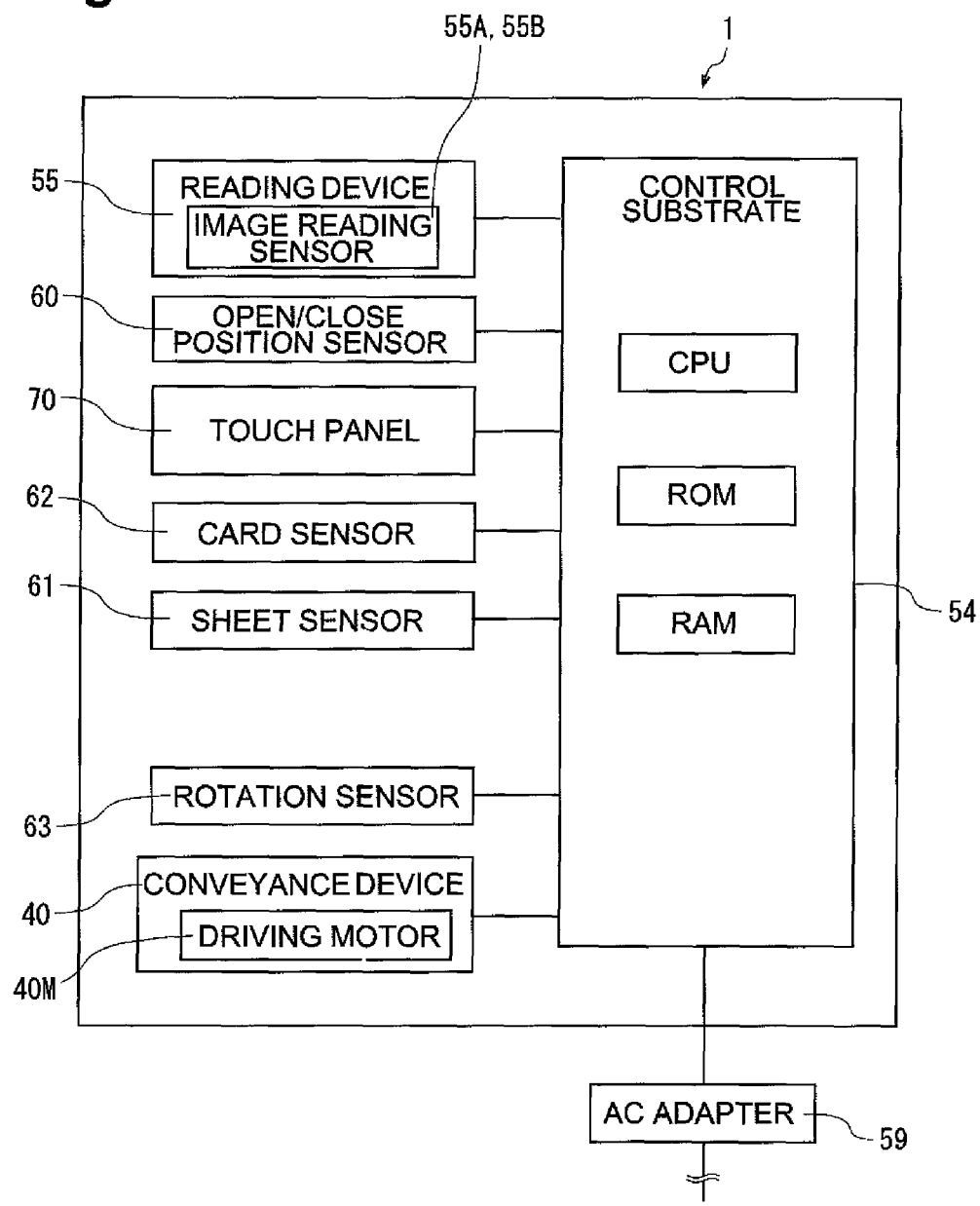
FIG. 4 is a block diagram of an image reading apparatus.

Referring now to FIGS. 4, 6, and 7, the conveyance device 40, the reading device 55, the touch panel 70, the open/close position sensor 60, the sheet sensor 61, the card sensor 62, the rotation sensor 63, and other components may be supplied with electric power from a home electric outlet (not shown) via an AC adapter 59 and a control substrate 54.

As shown in FIG. 4, the control substrate 54 may comprise a CPU, a ROM, and a RAM. The control substrate 54 may be electrically connected to a power source and may control the conveyance device 40, the reading device 55, the touch panel 70, the open/close position sensor 60, the sheet sensor 61, the card sensor 62, the rotation sensor 63, and other component in the image reading apparatus 1.

Referring now to FIGS. 5-7, the conveyance device 40 may comprise a separation roller 48; a separating pad 49; conveyance rollers 42A, 42B, and 42C; driven rollers 43A, 43B, and 43C; ejection rollers 44A, 44B, and 44C; and driven rollers 45A, 45B, and 45C. The reading device 55 may comprise image reading sensors 55A and 55B. These components may be arranged in the conveyance path 10 from the first inlet port 11 toward the first ejection port 12 in the following order: the separation roller 48 and the separating pad 49; the conveyance rollers 42A, 42B, and 42C and the driven rollers 43A, 43B, and 43C; the image reading sensors 55A and 55B; the ejection rollers 44A, 44B and 44C and the driven rollers 45A, 4513 and 45C.

As shown in FIG. 6, the separation roller 48 may be rotatably supported or mounted in the second housing 32. An upper portion of the separation roller 48 may be exposed from the sloped section of the lower guide surface 32G such that the upper portion is exposed in the conveyance path 10. As shown in FIG. 5, the separation roller 48 may be situated at an intermediate position of the conveyance path 10 in the left-right direction. The separation roller 48, by rotating, may send the one or more sheets SH out along the conveyance path 10. Moreover, the separation roller 48 may send a first sheet SH out along the conveyance path 10, while being in contact with a second sheet SH located on the feed tray 36.

As shown in FIG. 4, the separation roller 48 may be driven by a driving motor 40M. The CPU of the control substrate 54 may control the driving motor 40M.

In FIG. 6, the separating pad 49 may be attached to the first housing 31. The separating pad 49 may be exposed in the conveyance path 10 on the upper guide surface 31G. The separating pad 49 may be a plate-shaped member comprising a friction member such as, for example, rubber or elastomer. The separating pad 49 may be urged (e.g., driven forward, pushed) by an urging member (not shown) and may be pressed against the separation roller 48. Thus, in instances involving a plurality of sheets SH, the separation roller 48 and the separating pad 49 may nip (e.g., seize, catch hold of, latch onto) a first sheet SH, which is being conveyed in the conveyance path 10, and separate it from the other sheets SH in the plurality of sheets. The separation roller 48 may then repeat this process until all of the sheets in the plurality of sheets SH have been conveyed through the conveyance path 10.

As shown in FIGS. 5-7, the conveyance rollers 42A, 42B and 42C may be rotatably supported in the second housing 32 on an axis 42S. The conveyance rollers 42A, 42B and 42C may be rotatably supposed on the axis 42S by, for example, a shaft. Upper portions of the conveyance rollers 42A, 42B, and 42C may be exposed in the conveyance path 10 at a position between the sloped section and the horizontal section of the lower guide surface 32G. In particular, the upper portions of the conveyance rollers 42A, 42B, and 42C may be exposed from a connecting portion, wherein the connecting portion is a portion that connects the sloped section and the horizontal section of the lower guide surface 32G. As described above, in certain configurations, the CPU of the control substrate 54 may control the driving motor 40M. In such configurations, the conveyance rollers 42A, 42B, and 42C may be driven by the driving motor 40M to rotate synchronously with the separation roller 48.

The driven rollers 43A, 43B, and 43C may be rotatably supported in the first housing 31 on an axis 43S. Lower portions of the driven rollers 43A, 43B, and 43C may be exposed in the conveyance path 10 at a position between the sloped section and the horizontal section of the upper guide surface 31G. In particular, the lower portions of the driven rollers 43A, 43B, and 43C may be exposed from a connecting portion, wherein the connecting portion is a portion that connects the sloped section and the horizontal section of the upper guide surface 31G. The driven rollers 43A, 43B and 43C may be urged by an urging member (not shown) and may be pressed against the conveyance rollers 42A, 42B and 42C. Thus, when the sheet SH is conveyed, the conveyance rollers 42A, 42B and 42C and the driven rollers 43A, 43B and 43C may nip, in cooperation with each other, a sheet SH which is conveyed in the conveyance path 10. The conveyance rollers 42A, 42B and 42C and the driven rollers 43A, 43B and 43C may then rotate to convey the sheet SH toward the first ejection port 12.

As described above, since the side of the right end of the conveyance path 10 may be formed as the card conveying area 20 (e.g., since the card conveying area 20 may comprise an area situated on the side of a right end of the conveyance path 10), the right conveyance roller 42C and the right driven roller 43C may also be exposed in the card conveying area 20. Thus, when a card CA is conveyed, the conveyance roller 42C may nip, in cooperation with the driven roller 43C, the card CA, which was introduced into the second inlet port 21 and has passed through the card path 29 and the card conveying area 20. The conveyance roller 42C and the driven roller 43C may then rotate and convey the card CA to the second ejection port 22.

As shown in FIGS. 5-7, an image reading sensor 55A may be attached to the second housing 32. The image reading sensor 55A may comprise a Contact Image Sensor (CIS), a CIS holder, and a contact glass. An upper surface of the image reading sensor 55A may be exposed in the conveyance path 10. In particular, the upper surface of the image reading sensor 55A may be exposed from the horizontal section of the lower guide surface 32G. Additionally, an image reading sensor 55B may be attached to the first housing 31. The image reading sensor 55B may comprise a CIS, a CIS holder and a contact glass. A lower surface of the image reading sensor 55B may be exposed in the conveyance path 10. In particular, the lower surface of the image reading sensor 55B may be exposed from the horizontal section of the upper guide surface 31G. Thus, the image reading sensors 55A and 55B may be disposed on the upper and lower sides of the conveyance path 10 so as to face each other. The image reading sensors 55A and 55B may extend along the entire length of the conveyance path 10 in the left-right direction. Accordingly, the image reading sensors 55A and 55B may also be disposed on the upper and lower sides of the card conveying area 20.

The image reading sensors 55A and 55B may read images on both sides of a sheet SH which is conveyed in the conveyance path 10. Similarly, the image reading sensors 55A and 55B may read images on both sides of a card CA which is conveyed in the card conveying area 20. That is, the image reading sensors 55A and 55B may read images on both sides of the sheet SH when a sheet SH is conveyed and read images on both sides of the card CA when a card CA is conveyed. Images of the sheet SH and images of the card CA which are read by the image reading sensors 55A and 55B may be referred to as "medium images."

In certain configurations, only a part of the image reading sensor 55A may face a part of the image reading sensor 55B. In such configurations, the image reading sensor 55A may not directly face the image reading sensor 55B (e.g., the image reading sensor 55A may not be positioned directly across from the image reading sensor 55B). For example, the image reading sensor 55A may be placed or disposed further along the conveyance path 10 in the conveying direction of the sheet SH or the card CA. Thus, a part of the image reading sensor 55A may not face the image reading sensor 55B.

The ejection rollers 44A, 44B and 44C may be rotatably supported in the second housing 32 on an axis 44S. Upper portions of the ejection rollers 44A, 44B and 44C may be exposed in the conveyance path 10. In particular, the upper portions of the ejection rollers 44A, 44B and 44C may be exposed from the horizontal section of the lower guide surface 32G. When the CPU of the control substrate 54 controls the driving motor 40M, the ejection rollers 44A, 44B, and 44C may be driven, by the driving motor 40M, to rotate synchronously with the separation roller 48 and the conveyance rollers 42A, 42B, and 42C. Additionally, the driven rollers 45A, 45B, and 45C may be rotatably supported in the first housing 31 on an axis 45S. Lower portions of the driven rollers 45A, 45B and 45C may be exposed in the conveyance path 10 from the horizontal section of the upper guide surface 31G. The driven rollers 45A, 45B, and 45C may be urged by an urging member (not shown) and may be pressed against the ejection rollers 44A, 44B, and 44C. Thus, when the sheet SH is conveyed, the ejection rollers 44A, 44B, and 44C and the driven rollers 45A, 45B and 45C may nip, in cooperation with each other, the sheet SH which is conveyed in the conveyance path 10. The ejection rollers 44A, 44B, and 44C and the driven rollers 45A, 45B and 45C may then rotate in order to eject the sheet SH, via the first ejection port 12, to the outside (e.g., the outside of the housing 30).

Once again, since the side of the right end of the conveyance path 10 may be formed as the card conveying area 20, the right ejection roller 44C and the right driven roller 45C may also be exposed in the card conveying area 20. Thus, when a card CA is conveyed, the ejection roller 44C may nip, in cooperation with the driven roller 45C, the card CA, which has been conveyed thus far through the conveying area 20 by the conveyance roller 42C and the driven roller 43C. The ejection roller 44C and the driven roller 45C may then rotate and eject the card CA, via the second ejection port 22, to the outside (e.g., the outside of the housing 30).

Referring now to FIGS. 1, 3, and 6, the touch panel 70 may be attached to a side of the upper surface 31A of the first housing 31. The touch panel 70 may comprise a liquid crystal panel, a light source, and a touch sensitive film. The light source may be, for example, a fluorescent lamp or an LED. The light source may emit light from a portion (e.g., a side) of a back surface of the liquid crystal panel. The touch sensitive film may be configured to adhere to an upper surface of the liquid crystal panel. The upper surface of the liquid crystal panel may comprise a display screen 70A. Image information, e.g., characters and figures, may be displayed on the display screen 70A of the touch panel 70. In particular, an image of the sheet SH or an image of the card CA read by the image reading sensors 55A and 55B may be displayed on the display screen 70A of the touch panel 70. The image displayed on the display screen 70A of the touch panel 70 may be referred to as a "displayed image." The display screen 70A may be exposed to the outside (e.g., of the image reading apparatus 1) through a rectangular opening 31H which is formed in the upper surface 31A. The touch sensitive film, which is made to adhere to the display screen 70A, may detect contact with an arbitrary position (e.g., a particular position) on the display screen 70A of the touch panel 70. By detecting contact with an arbitrary position, the touch panel 70 may receive an operation.

The touch panel 70 may be controlled by the CPU of the control substrate 54. The touch panel 70 may display, for example, an operation state of the image reading apparatus 1. The operation state may be, for example, a processing status or an error status of an image reading operation. The touch panel 70 may display various buttons such as, for example, a "START" button B1 or B2, as shown in FIGS. 1 and 3. When the touch panel 70 is touched to perform an execution instruction of a process corresponding to one of the buttons or to perform a setting input, the touch panel 70 may receive an operation. Subsequently, a signal regarding the received operation may be transmitted to the control substrate 54 from the touch panel 70.

As shown in FIGS. 1 and 3, the open/close position sensor 60 may detect the position of the feed tray 36 with respect to the housing 30 (e.g., detect whether the feed tray 36 is in the open position or the closed position). The open/close position sensor 60 may be provided at a position corresponding to a rear side upper end portion of the right side frame 33R (e.g., a portion of the right side frame 33R located toward the rear and the top) and may adjoin the right hinge portion 36R. The open/close position sensor 60 may comprise, for example, a microswitch and a rotary switch. The open/close position sensor 60 may selectively engage and disengage when the feed tray 36 pivots about the opening and closing axis X36. After the open/close position sensor 60 detects the position of the feed tray 36, the open/close position sensor 60 may transmit a signal corresponding to whether the feed try 36 is in the open position or in the closed position to the control substrate 54. In particular, the open/close position sensor 60 may transmit a first kind of signal if the open/close position sensor 60 detects that the feed tray 36 is in the open position, and the open/close position sensor 60 may transmit a second kind of signal if the open/close position sensor 60 detects that the feed tray 36 is in the closed position If the feed tray 36 is in the open position, e.g., if the open/close position sensor 60 detects that the feed try 36 is in the open position, then the CPU of the control substrate 54 may control the conveyance device 40 to convey the sheet SH. If the feed tray 36 is in the closed position, e.g., if the open/close position sensor 60 detects that the feed tray 36 is in the closed position, then the CPU of the control substrate 54 may control the conveyance device 40 to convey the card CA.

Referring now to FIGS. 5 and 6, the sheet sensor 61 may detect whether there is a sheet SH in the first inlet port 11. In particular, the sheet sensor 61 may be provided in the first housing 31. The sheet sensor 61 may be situated near the separating pad 49 on the upper guide surface 31G. The sheet sensor 61 may comprise, for example, an optical proximity sensor or an ultrasonic system proximity sensor. The sheet sensor 61 may be configured to detect an approach or a separation of an object. After the sheet sensor 61 detects whether there is a sheet SH in the first inlet port 11, the sheet sensor 61 may transmit a detection signal to the control substrate 54 corresponding to whether a sheet SH is in the first inlet port 11. In particular, the sheet sensor 61 may transmit a first kind of detection signal if the sheet sensor 61 detects that a sheet SH is in the first inlet port 11, and the sheet sensor 61 may transmit a second kind of detection signal if the sheet sensor 61 detects that a sheet SH is not in the first inlet port 11.

Referring now to FIGS. 5 and 7, the card sensor 62 may detect whether there is a card CA in the second inlet port 21. In particular, the card sensor 62 may be provided in the second housing 32. The card sensor 62 may be exposed to the card conveying area 20 on a side of a rear end edge of the lower card guide surface 32I. The card sensor 62 may comprise, for example, an optical proximity sensor or an ultrasonic system proximity sensor. The card sensor 62 may detect an approach or a separation of an object. After the card sensor 62 detects whether there is a card CA in the second inlet port 21, the card sensor 62 may transmit a detection signal to the control substrate 54 corresponding to whether a card CA is in the second inlet port 21. In particular, the card sensor 62 may transmit a first kind of detection signal if the card sensor 62 detects that a card CA is in the second inlet port 21, and the card sensor 62 may transmit a second kind of detection signal if the card sensor 62 detects that a card CA is not in the second inlet port 21.

Referring now to FIGS. 1 and 8A-8C, the rotation sensor 63 may detect a rotation of the housing 30 about an axis line X30. The axis line X30 may be parallel to the vertical direction. In particular, as shown in FIG. 1, the rotation sensor 63 may be provided at a position adjoining the right side frame 33R in the second housing 32. The rotation sensor 63 may comprise, for example, a 3-axis acceleration sensor. The 3-axis acceleration sensor may detect an acceleration of the housing 30 and estimate (e.g., calculate) a rotation angle of the housing 30 about the axis line X30 in accordance with such acceleration. The rotation sensor 63 may then transmit a detection signal corresponding to the rotation angle of the housing 30 about the axis line X30 to the control substrate 54. For example, when the housing 30 is rotated from a state shown in FIG. 8A to a state shown in FIG. 8B, the rotation sensor 63 may transmit a detection signal corresponding to 180 degrees of the rotation angle to the control substrate 54. As another example, when the housing 30 is rotated from the state shown in FIG. 8A to a state shown in FIG. 8C, the rotation sensor 63 may transmit a detection signal corresponding to 90 degrees of the rotation angle to the control substrate 54. The detection signal of the rotation sensor 63 may be an example of the installation information, in which the installation condition of the housing 30 is reflected. Thus, the control substrate 54 may acquire the installation information from the rotation sensor 63.

Setting information regarding the installation condition of the housing 30 may be stored in a storage device such as, for example, the ROM or the RAM of the control substrate 54. Setting information may be externally set by a user P1 or other entity. The CPU of the control substrate 54 may control the touch panel 70 in accordance with the installation information acquired from the rotation sensor 63 and in accordance with the setting information stored in the ROM or the RAM. The CPU of the control substrate 54 may also change a direction of the image displayed on the display screen 70A. As described above, the image may comprise image information, e.g., characters and figures.

The setting information may be to change the direction of the image displayed on the display screen 70A so that the direction of the image corresponds to a direction in which the user P1 is viewing the image. For example, continuing from the examples above, when the housing 30 is rotated 180 degrees from the state shown in FIG. 8A to the state shown in FIG. 8B, the setting information may be to change the direction of the image displayed on the display screen 70A so that the user P1, positioned at a rear side of the image reading apparatus 1 (e.g., a side of the rear surface 32C of the housing 30), may easily view the image (e.g., view the image in an upright direction) from the rear side. The CPU of the control substrate 54, after acquiring the setting information, may then change the direction of the image displayed on the display screen 70A by rotating the image 180 degrees from the state shown in FIG. 8A to the state shown in FIG. 8B.

As another example, when the housing 30 is rotated 90 degrees from the state shown in FIG. 8A to the state shown in FIG. 8C, the setting information may be to change the direction of the image displayed on the display screen 70A so that the user P1 may easily view the image from a right side of the image reading apparatus 1 (e.g., a side of the right side frame 33R of the housing 30). The CPU of the control substrate 54, after acquiring the setting information, may then cause the direction of the image displayed on the display screen 70A to change by rotating the image 90 degrees, as shown in FIG. 8C.

In certain configurations of the image reading apparatus 1, the one or more images on the sheet SH or the card CA may be read as follows. When the feed try 36 is in the open position, images on the sheet SH may be read. In particular, if the feed tray 36 is in the open position, then the feed tray 36 may be kept in the open position. If the feed tray 36 is in the closed position, then the position of the feed try 36 may be changed to the open position. This may be done by the user P1.

As shown in FIG. 8A, a user P1 may be situated at a front side of the image reading apparatus 1. However, since the first inlet port 11 is provided on the rear surface 32C of the housing 30, the user P1 may rotate the image reading apparatus 1 by a particular angle, e.g., 180 degrees, so that the first inlet port 11 may turn to the user P1. The image reading apparatus 1 may comprise the rotation sensor 63; thus, when the image reading apparatus is rotated 180 degrees, as shown in FIG. 8B, the direction of the image displayed on the display screen 70A may be controlled to rotate in accordance with a detection result of the rotation sensor 63. The user P1 may then easily view the image displayed on the display screen 70A and easily operate the touch panel 70. In other words, such configurations reliably (e.g., automatically) allow the user P1 to view the image displayed on the display screen 70A.

Subsequently, the sheet SH may be placed on the feed tray 36. The control substrate 54 may then receive a sheet reading instruction from the touch panel 70 and initiate an image reading operation to read the images on the sheet SH. The sheet reading instruction may be generated when a sheet reading "START" button B2 displayed on the touch panel 70, as shown in FIG. 3, is pressed or selected. After the sheet reading instruction is generated, the touch panel 70 may transmit the sheet reading instruction to the control substrate 54.

The control substrate 54 may determine that the open/close position sensor 60 has detected that the feed tray 36 is in the open position and determine that the sheet sensor 61 has detected that the sheet SH is in the feed tray 36. The control substrate 54 may then control the driving motor 40M of the conveyance device 40 to initiate driving. Subsequently, the separation roller 48 may rotate and nip the sheet SH in cooperation with the separating pad 49. The separation roller 48 may take the sheet SH that has been introduced into the first inlet port 11 and sent it out along the conveyance path 10.

If a plurality of sheets SH is to be conveyed and is placed in an overlapped manner on the feed tray 36, then each of the plurality of sheets SH may be separated, one-by-one, by the frictional force between the separating pad 49 and the sheet SH.

Subsequently, the conveyance rollers 42A, 42B, and 42C and the driven rollers 43A, 43B, and 43C and the ejection rollers 44A, 44B, and 44C and the driven rollers 45A, 45B, and 45C may convey in the conveyance path 10 the sheet SH. As the sheet SH is being conveyed, the images on both sides of the sheet SH being conveyed in the conveyance path 10 may be read by the image reading sensors 55A and 55B. After the images are read, the sheet SH may be ejected from the first ejection port 12 to outside of the housing 30 by the ejection rollers 44A, 44B and 44C and the driven rollers 45A, 45B and 45C.

Alternatively, when the feed tray 36 is in the closed position, images on the card CA may be read. In particular, if the feed tray 36 is in the closed position, then the feed tray 36 may be kept in the closed position. If the feed tray 36 is in the open position, then the position of the feed try 36 may be changed to the closed position.

As shown in FIG. 8A, the user P1 may be situated at a front side of the image reading apparatus 1. However, since the second inlet port 21 is disposed on a rear side of the image reading apparatus 1, the user P1 may rotate the image reading apparatus 1 by a particular angle, e.g., 180 degrees, as shown in FIG. 8B, or 90 degrees, as shown in FIG. 8C. The user P1 may rotate the image reading apparatus 1 in order to change a direction that the second inlet port 21 is facing. By rotating the image reading apparatus 1 180 degrees, the user P1 may turn the second inlet port 21 so that it faces the front direction. Alternatively, by rotating the image reading apparatus 1 90 degrees, the user P1 may turn the second inlet port 21 so that it faces the left direction. The image reading apparatus 1 may comprise the rotation sensor 63; thus, when the image reading apparatus is rotated, as shown in FIGS. 8B and 8C, the direction of the image displayed on the touch panel 70 may be controlled to rotate in accordance with a detection result of the rotation sensor 63. The user P1 may then easily view the image displayed on the touch panel 70 and easily operate the touch panel 70.

Subsequently, the card CA may be introduced or inserted into the second inlet port 21. When the card CA is introduced into the second inlet port 21, the card CA may pass or be conveyed through the card path 29 and a front or leading end of the card CA may reach the card conveying area 20. The control substrate 54 may receive a card reading instruction from the touch panel 70, and the CPU of the control substrate 54 may initiate an image reading operation to read the images on the card CA. The card reading instruction may be issued when a card reading "START" button B1 displayed on the touch panel 70, as shown in FIG. 1, is pressed or selected. After the card reading instruction is generated, the touch panel 70 may transmit the card reading instruction to the control substrate 54.

The control substrate 54 may determine that the open/close position sensor 60 has detected that the feed tray 36 is in the closed position and determine that the card sensor 62 has detected that the card CA is in the second inlet port 21. The control substrate 54 may then control the driving motor 40M of the conveyance device 40 to initiate driving. Subsequently, the conveyance roller 42C and the driven roller 43C and the ejection roller 44C and the driven roller 45C may convey, in the card conveying area 20, the card CA, which has been introduced into the second inlet port 21 and passed through the card path 29. Images on both sides of the card CA, which is being conveyed in the conveyance path 20, may be read by the image reading sensors 55A and 55B. Then, as shown in FIG. 1, after the images are read, the card CA may be ejected from the second ejection port 22 to outside of the housing 30 by the ejection roller 44C and the driven roller 45C.

In such configurations, the conveyance path 10 may be used as both a conveyance path for the sheet SH and a conveyance path for a card CA. Thus, an image reading apparatus 1 may be reduced in size.

Moreover, in such configurations, the CPU of the control substrate 54 may acquire installation information reflecting an installation condition of the housing 30. The installation information may reflect when the installation condition of the housing 30 changes. In particular, the installation condition of the housing 30 may be changed in order to facilitate performing any one of inserting or introducing the sheet SH into the first inlet port 11, taking or removing the sheet SH ejected from the first ejection port 12, inserting the card CA into the second inlet port 21, and taking the card CA ejected from the second ejection port 22.

The CPU of the control substrate 54 may also acquire setting information regarding the installation condition of the housing 30 from a storage device such as, for example, the ROM or the RAM. The setting information may be externally set by the user P1 or other entity and may be stored in the storage device. The CPU of the control substrate 54 may control the touch panel 70 and change the direction of the image displayed on the display screen 70A in accordance with the acquired installation information or setting information. In particular, in such configurations, the CPU of the control substrate 54 may acquire the installation information of the housing 30 from the rotation sensor 63, which detects any rotation of the housing 30 about the axis line X30. The CPU of the control substrate 54 may then change the direction of the image displayed on the display screen 70A based on installation information. For example, as shown in FIGS. 8B and 8C, if the CPU of the control substrate 54 determines, in accordance with the detection signal of the rotation sensor 63, that the housing 30 has been rotated 180 degrees or 90 degrees about the axis line X30, the direction of the image may be rotated 180 degrees or 90 degrees, respectively.

Therefore, in such configurations, the user P1 may easily view the image displayed on the display screen 70, even if the installation condition of the housing 30 is changed in order to facilitate an image reading operation.

Additionally, in such configurations, the feed tray 36 may be necessary for conveying the sheet SH but not always necessary for conveying the card CA. Thus, when the feed tray 36 is not needed (e.g., when the conveyance device 40 may be conveying a card CA) and the feed tray 36 is in the closed position, the user P1 may not need to open the feed tray 36. In particular, when the feed tray 36 is in the closed position, the user P1 may still reliably view (e.g., be able to view) the display screen 70A of the touch panel 70 via the operation opening 39. The user P1 may also perform an input by touching the touch panel 70 via the operation opening 39.

Referring now to FIG. 9, in other configurations of the image reading apparatus 1, a human sensor 64A may be provided on the front surfaces 31B and 32B of the housing 30 and a human sensor 64B may be provided on the rear surface 32C of the housing 30. The human sensors 64A and 64B may be provided in lieu of the rotation sensor 63.

The human sensors 64A and 64B may detect the user P1 if the user P1 is close to the image reading apparatus 1. The human sensor 64A may be provided at an intermediate position in the left-right direction on the front surface 31B of the first housing 31 or the front surface 32B of the second housing 32. The human sensor 64B may be provided at an intermediate position in the left-right direction on the rear surface 32C of the second housing 32. The human sensors 64A and 64B may comprise, for example, a sensor which detects a temperature change caused by infrared rays emitted by a human being or other object (e.g., the user P1). As another example, the human sensors 64A and 64B may comprise a motion sensor that detects a moving object (e.g., the user P1). Similar to the rotation sensor 63, the human sensors 64A and 64B may be connected to the control substrate 54.

Figure 9A:
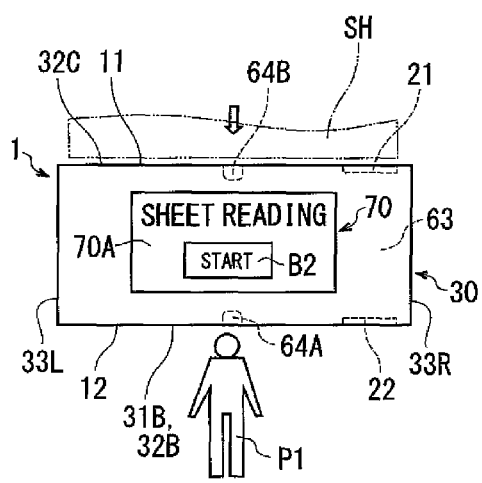
FIG. 9A is a schematic diagram showing a direction of an image displayed on a display screen when a user is situated on a side of a front surface of a body of an image reading apparatus.

As shown in FIG. 9A, if the user P1 is close to the image reading apparatus 1 and on a side of the front surfaces 31B and 32B of the housing 30, the human sensor 64A may detect a presence or existence of the user P1. The human sensor 64A may then transmit a detection signal representing the existence of the user P1 to the control substrate 54. In such instances, the human sensor 64B may detect an absence of the user P1 (e.g., may not detect the existence of the user P1). Thus, the human sensor 64B may transmit a detection signal representing the absence of the user P1 to the control substrate 54.

Figure 9B:
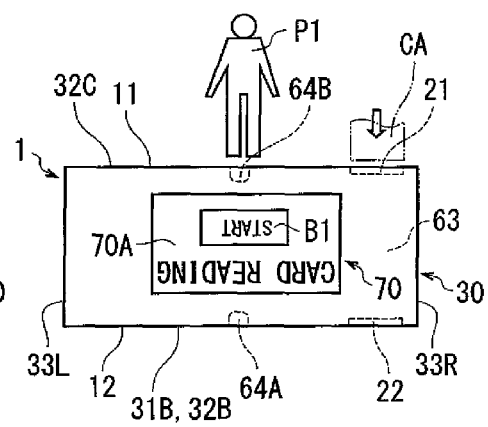
FIG. 9B is a schematic diagram showing the direction of the image of FIG. 9A when the user is situated on a side of a rear surface of the body.

Alternatively, as shown in FIG. 9B, if the user P1 is close to the image reading apparatus 1 and on a side of the rear surface 32C of the housing 30, the human sensor 64B may detect the existence of the user P1. The human sensor 64B may then transmit a detection signal representing the existence of the user P1 to the control substrate 54. In such instances, the human sensor 64A may detect the absence of the user P1 (e.g., may not detect the existence of the user P1). Thus, the human sensor 64A may transmit a detection signal representing the absence of the user P1 to the control substrate 54. The detection signals of the human sensors 64A and 64B may be examples of the installation information in which the installation condition of the housing 30 is reflected. Accordingly, the control substrate 54 may acquire the installation information from the human sensors 64A and 64B.

In such configurations, the installation information reflecting an installation condition of the housing 30 may also comprise, for example, the detection signal of the open/close position sensor 60, the detection signal of the sheet sensor 61, and the detection signal of the card sensor 62. In other words, the detection signal of the open/close position sensor 60, the detection signal of the sheet sensor 61, and the detection signal of the card sensor 62 may also be examples of the installation information in which the installation condition of the housing 30 is reflected. The control substrate 54 may acquire such installation information from the open/close position sensor 60, the sheet sensor 61, and the card sensor 62.

Additionally, setting information to be set regarding the installation condition of the housing 30 may be stored in a storage device, e.g., the ROM or the RAM of the control substrate 54. The CPU of the control substrate 54 may control the touch panel 70 in accordance with the installation information acquired from the human sensors 64A and 64B and in accordance with the setting information stored in the ROM or the RAM. The CPU of the control substrate 52 may also change the direction of the image displayed on the display screen 70A.

For example, when the user P1 exists on the side of the front surfaces 31B and 32B of the housing 30, as shown in FIG. 9A, the setting information may be to change the direction of a displayed image (e.g., an image displayed on the display screen 70A) so that the user P1 may easily view the image from the side of the front surfaces 31B and 32B of the housing 30 (e.g., to change the direction of the image such that it may be viewed in an upright position from the side of the front surfaces 31B and 32B of the housing 30) or, when the direction of the displayed image has already been set such that the user P1 may easily view the image, to keep the direction of the image in its present state. Thus, when the human sensor 64A detects that the user P1 exists on the side of the front surfaces 31B and 32B of the housing 30, the CPU of the control substrate 54 may control the touch panel 70 in accordance with the setting information and change the direction of the displayed image so that the user P1 may easily view the image from the side of the front surfaces 31B and 32B of the housing 30. Alternatively, when the direction of the displayed image has already been set to a state shown in FIG. 9A, the CPU of the control substrate 54 may keep the displayed image in that state.

When a sheet SH is introduced into a first inlet port 11, as shown in FIG. 9A, the setting information may be to change the direction of the image displayed on the display screen 70A so that the user P1 may easily view the image from the side of the front surfaces 31B and 32B of the housing 30. Similar to the above, when the sheet sensor 61 detects that the sheet SH is introduced into the first inlet port 11, the CPU of the control substrate 54 may change the direction of the displayed image to the state shown in FIG. 9A, or, when the direction of the displayed image has already been set to a state shown in FIG. 9A, keep the displayed image in that state.

As another example, when the user P1 exists on the side of the rear surface 32C of the housing 30, as shown in FIG. 9B, the setting information may be to change the direction of the displayed image so that the user P1 may easily view the image from the side of the rear surface 32C of the housing 30 (e.g., to change the direction of the image such that it may be viewed in an upright position from the side of the rear surface 32C of the housing 30). Thus, when the human sensor 64B detects that the user P1 exists on the side of the rear surface 32C of the housing 30, the CPU of the control substrate 54 may control the touch panel 70 in accordance with the setting information and change the direction of the displayed image a state shown in FIG. 9B, or, when the direction of the displayed image has already been set to the state shown in FIG. 9B, keep the state.

When a card CA is introduced into a second inlet port 21, as shown in FIG. 9B, the setting information may also be to change the direction of the displayed image so that the user P1 may easily view the image from the side of the rear surface 32C of the housing 30. In this case, when the card sensor 62 detects that the card CA is introduced into the second inlet port 21, the CPU of the control substrate 54 may change the direction of the image displayed on the display screen 70A as illustrated in FIG. 9B and, when the direction of the displayed image has been set as illustrated in FIG. 9B, the CPU of the control substrate 54 may keep the state.

The setting information may be, as illustrated in FIG. 3, when the feed tray 36 is in an open position, to change the direction of the image displayed on the display screen 70A so that the user may easily view the image from the side of the front surfaces 31B and 32B of the housing 30. Similar to the above, when the open/close position sensor 60 detects that the feed tray 36 is in the open position, the CPU of the control substrate 54 may change the direction of the displayed image the state shown in FIG. 9B, or, when the direction of the displayed image has already been set to a state shown in FIG. 9B, keep the displayed image in that state.

Thus, in such configurations, the CPU of the control substrate 54 may acquire the installation information of the housing 30 from the human sensors 64A and 64B, the open/close position sensor 60, the sheet sensor 61, and the card sensor 62. Also, as shown in FIGS. 9A and 9B, the CPU of the control substrate 54 may change the direction of the image displayed on the display screen 70A.

Moreover, such configurations may be capable of conveying a sheet SH and a card CA, which are different in width, and may let the user P1 to easily view the image displayed on the display screen 70A even if the installation condition of the housing 30 is changed.

Figure 10:
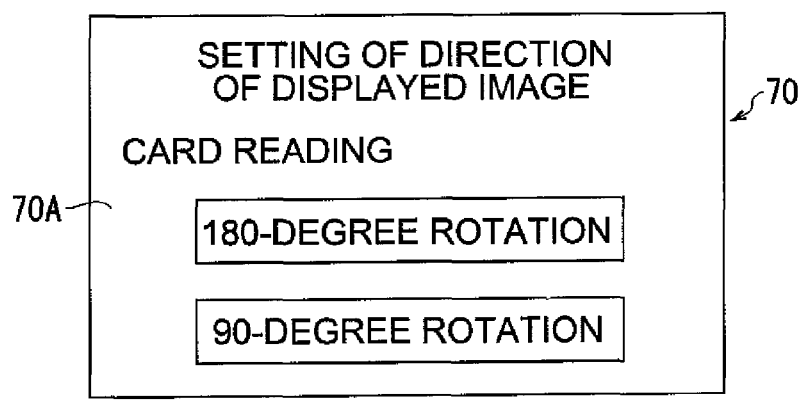
FIG. 10 is a diagram showing an example of a setting screen which is displayed on a touch panel of an image reading apparatus.
Figure 11:
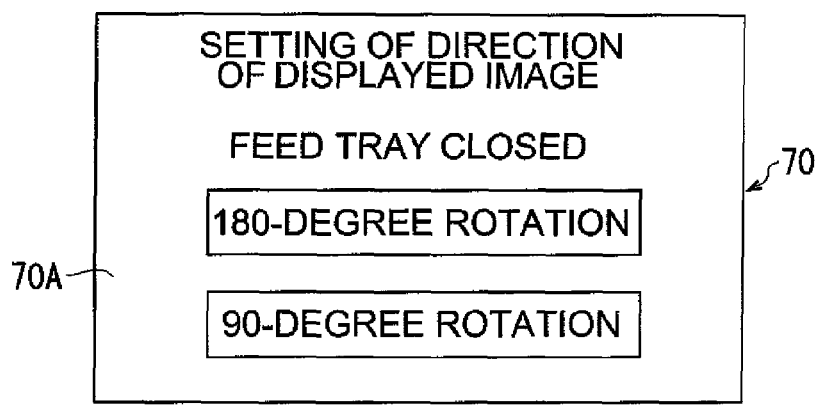
FIG. 11 is a diagram showing another example of a setting screen which is displayed on a touch panel of an image reading apparatus.
Figure 12:
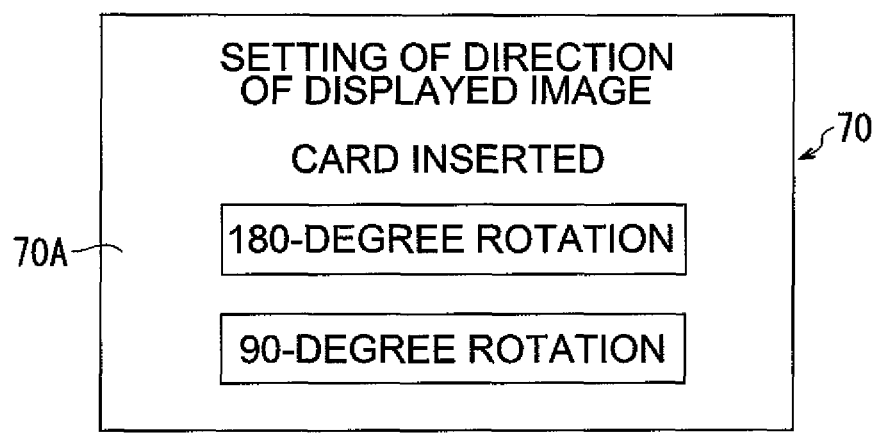
FIG. 12 is a diagram showing yet another example of a setting screen which is displayed on a touch panel of an image reading apparatus according to yet another embodiment of the invention.

Referring now to FIGS. 10-12, in particular configurations, the setting information may also be set via a touch panel 70. Similar to the above embodiments, the setting information may be stored in, for example, the ROM or the RAM of the control substrate 54 in the image reading apparatus 1.

In such configurations, a CPU of a control substrate 54 may display a setting screen on a display screen 70A of the touch panel 70. The touch panel 70 may receive an operation to associate the direction of an image displayed on the display screen 70A with an installation condition of the housing 30. The operation may be considered the setting information. The operation may be carried out by a user P1 on the setting screen of the touch panel 70. After the operation is received by the touch panel 70, the operation may be transmitted from the touch panel 70 to the control substrate 54 and stored in a storage device such as the ROM or the RAM.

Subsequently, the CPU of the control substrate 54 may control the touch panel 70 in accordance with the installation information, as described above with respect to other configurations, or in accordance with the setting information and may change the direction of the image displayed on the display screen 70A.

In particular, associating the direction of the image displayed on the display screen 70A with the installation condition of the housing 30 may comprise uniquely determining a relationship between a specific installation condition of the housing 30 and a specific direction of the image displayed on the display screen 70A. Thus, an operation to associate the direction of an image displayed on the display screen 70A with the installation condition of the housing 30 may comprise an operation to determine a relationship between a specific installation condition of the housing 30 and a specific direction of the image displayed on the display screen 70A.

As an example, when the user P1 operates a "180-degree rotation" button or a "90-degree rotation" button on a "card reading" setting screen, as shown in FIG. 10, a relationship between a state in which the image reading apparatus is in a card reading mode and the direction of the displayed image corresponding to a 180-degree rotation or a 90-degree rotation may be uniquely determined.

As another example, when the user P1 operates the "180-degree rotation" button or the "90-degree rotation" button on a "feed tray closed" setting screen, as shown in FIG. 11, a relationship between a state in which the feed tray 36 is closed and the direction of the displayed image corresponding to a 180-degree rotation or a 90-degree rotation may be uniquely determined.

As a further example, when the user P1 operates the "180-degree rotation" button or the "90-degree rotation" button on a "card inserted" setting screen, as shown in FIG. 12, a relationship between a state in which the card CA may be inserted and the direction of the displayed image corresponding to a 180-degree rotation or a 90-degree rotation may be uniquely determined.

When an operation to associate the direction of an image displayed on the display screen 70A with the installation condition of the housing 30 is carried out by the user P1 on the touch panel 70, which may display the setting screens that are shown in FIGS. 10-12, the touch panel 70 may receive the operation. Then, the received operation may be transmitted from the touch panel 70 to the control substrate 54 and stored in a storage device, such as the ROM or the RAM, as setting information. Therefore, in such configurations, the image reading apparatus may easily perform a setting (e.g., turning the direction of the displayed image) to suitably satisfy the user P1's needs.

Figure 13:
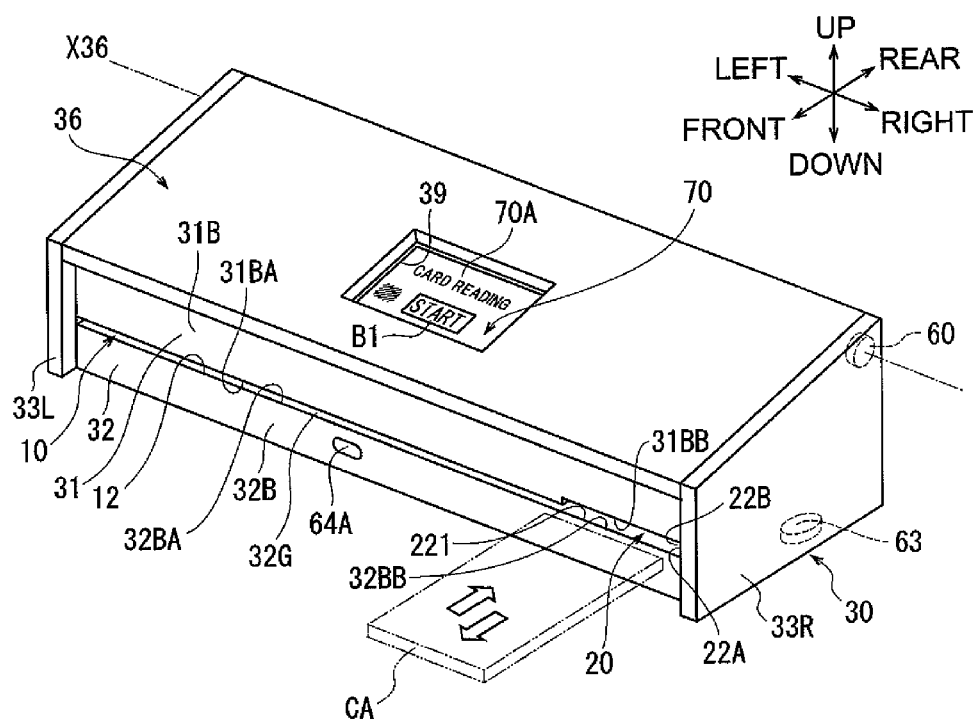
FIG. 13 is a perspective view showing another example of a front side of an image reading apparatus.
Figure 14:
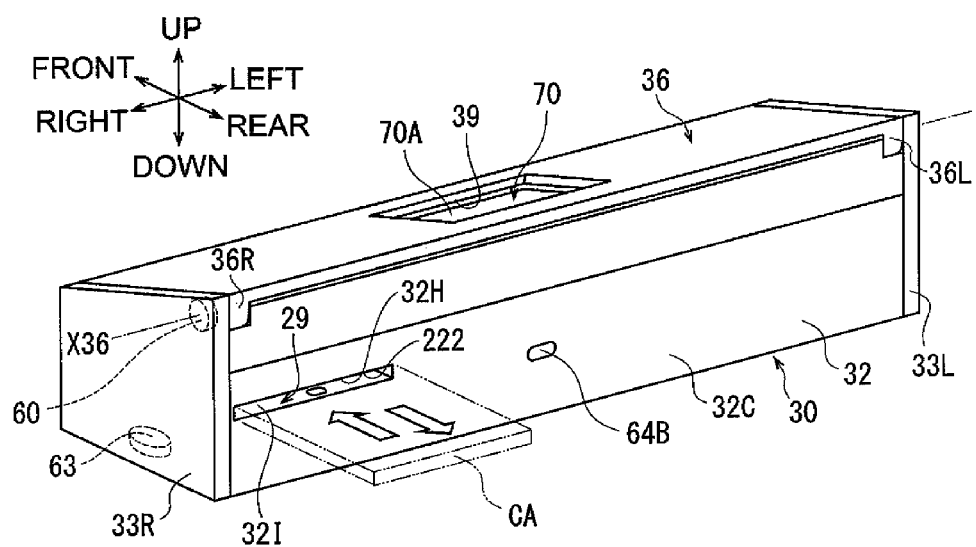
FIG. 14 is a perspective view showing another example of a rear side of an image reading apparatus.

Referring now to FIGS. 13 and 14, in still other configurations, the image reading apparatus 1 may comprise a second inlet and ejection port 221 and an intermediate ejection port 222. In such configurations, the second ejection port 22 of the image reading apparatus 1 may be replaced with the second inlet and ejection port 221 and the second inlet port 21 may be replaced with the intermediate ejection port 222.

The second inlet and ejection port 221 may be identical in shape with the second ejection port 22 (e.g., comprise a shape that is identical to that of the second ejection port 22), according to other configurations of the image reading apparatus 1. Similarly, the second inlet and ejection port 221 may be shared by a part of the first ejection port 12 (e.g., the first ejection port 12 may comprise a portion of the second inlet and ejection port 221) at a position near the right side frame 33R (e.g., at the right end of the first ejection port 12). The intermediate ejection port 222 may be identical in shape with the second inlet port 21, according to other configurations of the image reading apparatus 1.

A card CA may be introduced into the second inlet and ejection port 221. The conveyance device 40 may convey the card CA toward the rear direction in the card conveying area 20. In particular, the CPU of the control substrate 54 may cause the conveyance device 40 to be driven a direction opposite to a direction in which the conveyance device 40 conveyed the card CA to the second ejection port 22. Then, the card CA may pass the card path 29 and a part of the card CA may be ejected from the intermediate ejection port 222 to the outside of the housing 30. Subsequently, the conveyance device 40 may convey the card CA toward the front direction in the card path 29 and the card conveying area 20. Then, after an image is read by image reading sensors 55A and 55B, the card CA may be ejected from the second inlet and ejection port 221 to the outside of the housing 30.

In such configurations, the housing 30 may be rotated or moved so that the card CA does not touch an obstacle (e.g., a wall) while passing through the intermediate ejection port 222 and reaching the alignment position. In such cases, the CPU of the control substrate 54 may change the direction of the image displayed on a display screen 70A in accordance with, for example, a detection result of the rotation sensor 63, the human sensors 64A and 64B, the open/close position sensor 60, the sheet sensor 61, or the card sensor 62.

Therefore, such configurations may be capable of conveying the sheet SH and the card CA, which are different in width, and may let a user P1 easily view the image displayed on the display screen 70A even if the installation condition of the housing 30 is changed.

Figure 15:
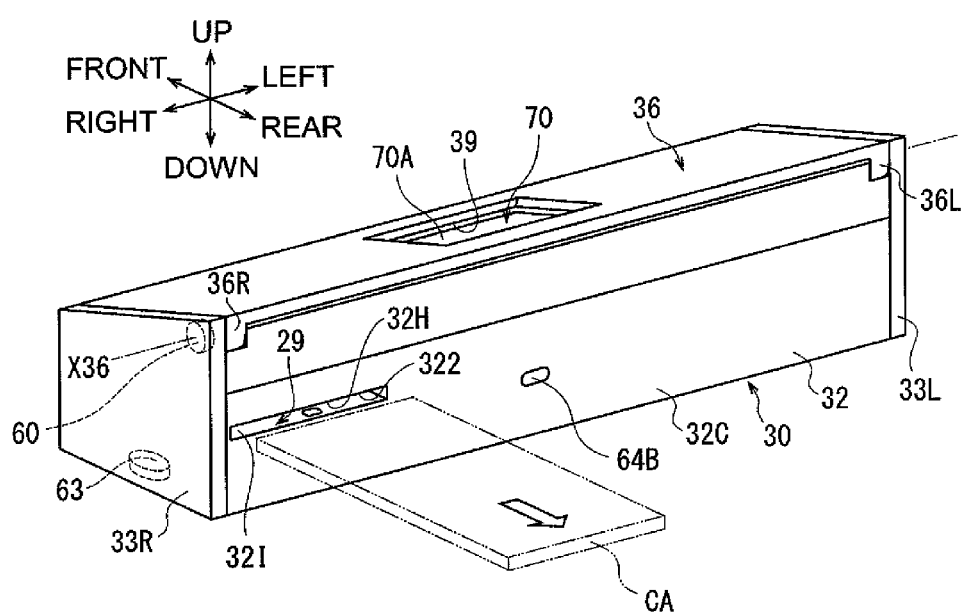
FIG. 15 is a perspective view showing yet another example of a rear side of an image reading apparatus.

Referring now to FIG. 15, in yet other configurations, the second ejection port 22 of the image reading apparatus 1 may serve as a second inlet port into which a card CA may be introduced and the second inlet port 21 of the image reading apparatus 1 may be replaced with a second ejection port 322 through which the card CA may be ejected.

The second inlet port may be identical in shape with the second ejection port 22 and the ejection port 221, according to other configurations of the image reading apparatus 1. Similarly, the second ejection port 322 may be identical in shape with the second inlet port 21 and the intermediate ejection port 222, according to other configurations of the image reading apparatus 1.

The card CA may be introduced into the second inlet port. The conveyance device 40 may convey the card CA toward the rear direction in the card conveying area 20. After an image on the card CA is read by the image reading sensors 55A and 55B, the card CA may pass through the card path 29 and may be ejected from the second ejection port 322 to outside of the housing 30.

In such configurations, the housing 30 may be rotated or moved so that the card CA does not touch an obstacle (e.g., a wall) when the card CA is being ejected from the second ejection port 322. In such cases, the CPU of the control substrate 54 may change the direction of an image displayed on the display screen 70A in accordance with, for example, a detection result of the rotation sensor 63, the human sensors 64A and 64B, the open/close position sensor 60, the sheet sensor 61, or the card sensor 62.

Therefore, such configurations may be capable of conveying the sheet SH and the card CA, which are different in width, and may let a user P1 easily view the image displayed on the display screen 70A even if the installation condition of the housing 30 is changed.

Referring now to FIG. 16, an image reading system 100 now is described. The image reading system 100 may be a particular configuration of an image reading system. The image reading system 100 may comprise the image reading apparatus 1, according to the configurations shown in FIGS. 1-8C, and an information processing apparatus 101. The image reading apparatus 1 is described above. The image processing apparatus 101 may be a device (e.g., a personal computer, a smartphone) which may execute various applications. The image reading apparatus 1 and the information processing apparatus 101 may be connected to each other such that information may be transmitted between the image reading apparatus 1 and the information processing apparatus 101. In particular, the image reading apparatus 1 and the information processing apparatus 101 may be connected via a wireless or a wired connection.

The information processing apparatus 101 may comprise an external acquisition device 170. The external acquisition device 170 may be, for example, an information processing device such as a personal computer, which comprises a CPU, a display, and a keyboard, or a smartphone, which comprises a CPU and a touch panel display screen.

The external acquisition device 170 may store a setting application A1 in a storage device (not shown). The setting application A1 may be an example of a remote setting section of the present disclosure.

The information processing device may receive an operation from outside (e.g., of the image reading system 100) by executing the setting application A1 and using the display. The operation may be inputted by a user P1 using the keyboard or the touch panel display screen. Moreover, by executing the setting application A1, the information processing device may carry out a setting to associate a direction of an image displayed on the display screen 70A with an installation condition of the housing 30 of the image reading apparatus 1. Carrying out the setting may comprise determining (e.g. generating) the setting information, which is externally set, regarding the installation condition of the housing 30.

The control substrate 54 of the image reading apparatus 1 may then acquire the setting information from the external acquisition device 170 of the information processing apparatus 101. The CPU of the control substrate 54 may control the touch panel 70 in accordance with the setting information acquired by the external acquisition device 170 and may change the direction of the image displayed on the display screen 70A.

As an example, when the user P1 rotates the image reading apparatus 1 180 degrees, the user P1 may find it difficult to view the image displayed on the display screen 70A. For instance, the user P1 may find it difficult to view the image displayed on the display screen 70A because the image is not displayed in an upright position. To change the direction of the image so that the image may be viewed easily, execution of the setting application A1 may be initiated in the information processing apparatus 101. By changing the direction of the image so that it may be viewed easily, when a card CA is inserted into the second inlet port 21, the user P1 may easily operate the touch panel 70 and reading of the card CA may be initiated by operating a card reading start button of the setting application A1 (e.g., reading of the card CA may be carried out after the user P1 operates the card reading start button).

The image reading system 100 may be capable of conveying, via the image reading apparatus 1, the sheet SH and the card CA, which are different in width, in a conveyance path 10 and, at the same time, may let the user easily view the image displayed on the display screen 70A even if the installation condition of the housing 30 of the image reading apparatus 1 is changed.

In certain configurations, the information processing device of the information processing apparatus 101, instead of the CPU of the control substrate 54 of the image reading apparatus 1, may control the touch panel 70 of the image reading apparatus 1 in accordance with the setting information acquired by the external acquisition device 170 of the information processing apparatus 101 and may change the direction of the image displayed on the display screen 70A. In such configurations, the information processing device of the information processing apparatus 101 may be an example of the display control device of the present disclosure, wherein the display control device is provided in the information processing apparatus.

In other configurations, after the card CA is exposed temporarily outside (e.g., of the housing 30) from the second ejection port 22, the card CA may be conveyed in a reverse direction toward the second inlet port 21 and may be ejected from the second inlet port 21 to the outside of the housing 30.

In particular configurations, instead of the CIS, a charge coupled device ("CCD") or other known image acquisition devices may be employed.

In still other configurations, the above-described processes may be performed by a plurality of CPUs, a special application specific integrated circuit "ASIC," or a combination of a CPU and an ASIC.

While the invention has been described in connection with various exemplary structures and illustrative configurations, it will be understood by those skilled in the art that other variations and modifications of the structures, configurations, and embodiments disclosed above may be made without departing from the scope of the invention. Other structures, configurations, and embodiments consistent with the scope of the claimed invention will be apparent to those skilled in the art from a consideration of the specification or practice of the invention disclosed herein. It is intended that the specification and the described examples are illustrative with the true scope of the invention being defined by the following claims.

What is claimed is:

1. An image reading apparatus, comprising:
   a body comprising:
      a first inlet port configured to receive a first medium introduced into the image reading apparatus;
      a first ejection port configured to eject the first medium from the image reading apparatus;
      a second inlet port configured to receive a second medium introduced into the image reading apparatus, wherein the second medium is narrower than the first medium;
      a second ejection port configured to eject the second medium from the image reading apparatus; and
      a conveyance path along which the first medium introduced into the first inlet port and the second medium introduced into the second inlet port are conveyed;
   a reading device configured to read medium images on the first medium and the second medium which are conveyed in the conveyance path;
   a display device provided in the body, the display device configured to display a displayed image; and
   a control device configured:
      to acquire, via an acquisition device, at least one of installation information reflecting an installation condition of the body and setting information, which is externally set, regarding the installation condition of the body,
      to control the display device in accordance with at least one of the installation information and the setting information acquired by the acquisition device, and
      to change a direction of the displayed image displayed on the display device.

2. The image reading apparatus according to claim 1, wherein:
   the acquisition device comprises a rotation sensor configured to detect a rotation of the body about an axis line, wherein the axis line is parallel to a vertical direction; and
   the acquisition device is configured to acquire the installation information reflecting an installation condition of the body, the installation condition comprising the rotation of the body detected by the rotation sensor.

3. The image reading apparatus according to claim 2, wherein the control device is further configured to:
   determine, based on the rotation of the body detected by the rotation sensor, whether the body has rotated 180 degrees about the axis line; and
   rotate the direction of the displayed image 180 degrees in response to determining that the body has rotated 180 degrees about the axis line.

4. The image reading apparatus according to claim 1, further comprising a setting device configured to receive an operation from outside of the image reading apparatus and to generate the setting information regarding the installation condition of the body,
   wherein the acquisition device is configured to acquire the setting information from the setting device, and
   wherein the control device is configured to associate the direction of the displayed image with the installation condition.

5. The image reading apparatus according to claim 1, further comprising:
   a feed tray movable between an open position and a closed position, wherein the feed tray is configured:

to be opened with respect to the body in the open position to expose the first inlet port, and to permit placement of the first medium on the feed tray for introduction into the first inlet port, and to cover the first inlet port in the closed position; and a conveyance control device configured:

to control a conveyance device to convey the first medium introduced into the first inlet port in a state in which the feed tray is in the open position, and to control the conveyance device to convey the second medium introduced into the second inlet port in a state in which the feed tray is in the closed position, wherein the body further comprises the conveyance device, the conveyance device configured to convey the first medium and the second medium along the conveyance path.

6. The image reading apparatus according to claim 5, wherein:

the display device is disposed on an upper surface of the body; and the feed tray is further configured to cover the upper surface of the body in the closed position and comprising an opening configured to expose the display device outside of the image reading apparatus in the closed position.

7. The image reading apparatus according to claim 6, wherein the display device is a touch panel, wherein the touch panel is configured to receive an input in response to detecting contact with a particular position on the display device.

8. The image reading apparatus according to claim 1, wherein:

the first inlet port is disposed on a first side of the reading device in a conveying direction of the first medium;

the first ejection port is disposed on a second side of the reading device in the conveying direction;

the second inlet port is disposed on the first side of the reading device in the conveying direction; and the second ejection port is disposed on the second side of the reading device in the conveying direction.

9. The image reading apparatus according to claim 1, wherein:

the first inlet port is disposed on a first side of the reading device in a conveying direction;

the first ejection port is disposed on a second side of the reading device in the conveying direction;

the second inlet port is disposed on the second side of the reading device in the conveying direction; and the second ejection port is disposed on the first side of the reading device in the conveying direction.

10. The image reading apparatus according to claim 1, wherein:

the first inlet port is disposed on a first side of the reading device in a conveying direction of the first medium;

the first ejection port is disposed on a second side of the reading device in the conveying direction; and the second inlet port is disposed on the second side of the reading device in the conveying direction and is configured such that the second medium is ejected therefrom.

11. An image reading system comprising an image reading apparatus and an information processing apparatus, the image reading apparatus and the information processing apparatus configured to be connected to each other and configured such that information is transmittable therebetween, wherein:

the image reading apparatus comprises:

a body comprising:

a first inlet port configured to receive a first medium introduced into the image reading apparatus;

a first ejection port configured to eject the first medium from the image reading apparatus;

a second inlet port configured to receive a second medium introduced into the image reading apparatus, wherein the second medium is narrower than the first medium;

a second ejection port configured to eject the second medium from the image reading apparatus; and a conveyance path along which the first medium introduced into the first inlet port and the second medium introduced into the second inlet port are conveyed;

a reading device configured to read medium images on the first medium and the second medium which are conveyed in the conveyance path; and a display device provided in the body, the display device configured to display a displayed image;

the information processing apparatus comprises a first control device configured to acquire, via an external acquisition device, setting information, which is externally set, regarding the installation condition of the body;

one of the image reading apparatus and the information processing apparatus comprises a second control device configured to control the display device in accordance with the setting information acquired by the acquisition device and to change a direction of the displayed image displayed on the display device.

12. The image reading system according to claim 11, wherein:

the information processing apparatus further comprises an external setting device configured to receive an operation from outside of the image reading system and to generate the setting information regarding the installation condition of the body;

the external acquisition device is configured to acquire the setting information from the external setting device; and the second control device is configured to associate the direction of the displayed image with the installation condition.

13. A medium conveying device, comprising:

a body comprising:

a first inlet port configured to receive a first medium introduced into the medium conveying device;

a first ejection port configured to eject the first medium from the medium conveying device;

a second inlet port configured to receive a second medium introduced into the medium conveying device, wherein the second medium is narrower than the first medium;

a second ejection port configured to eject the second medium from the medium conveying device; and a conveyance path configured along which the first medium introduced into the first inlet port and the second medium introduced into the second inlet port are conveyed;

a display device provided in the body, the display device configured to display a displayed image; and a control device configured:

to acquire, via an acquisition device, at least one of installation information reflecting an installation condition of the body and setting information, which is externally set, regarding the installation condition of the body, to control the display device in accordance with at least one of the installation information and the setting information acquired by the acquisition device, and to change a direction of the displayed image displayed on the display device.

14. The medium conveying device according to claim 13, wherein:
the acquisition device comprises a rotation sensor configured to detect a rotation of the body about an axis line, the axis line parallel to a vertical direction; and
the acquisition device is configured to acquire the installation information reflecting an installation condition of the body, the installation condition comprising the rotation of the body detected by the rotation sensor.

* * * * *